(12) United States Patent
Yoon

(10) Patent No.: US 9,980,245 B2
(45) Date of Patent: *May 22, 2018

(54) METHOD AND APPARATUS FOR TRANSMITTING SYNCHRONIZATION SIGNAL FOR DEVICE TO DEVICE COMMUNICATION IN WIRELESS COMMUNICATION SYSTEM

(71) Applicant: Innovative Technology Lab Co., Ltd., Seoul (KR)

(72) Inventor: Sung Jun Yoon, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/664,415

(22) Filed: Jul. 31, 2017

(65) Prior Publication Data

US 2017/0332339 A1 Nov. 16, 2017

Related U.S. Application Data

(63) Continuation of application No. 15/417,677, filed on Jan. 27, 2017, now Pat. No. 9,756,588, which is a
(Continued)

(30) Foreign Application Priority Data

Aug. 11, 2014 (KR) ........................ 10-2014-0103977

(51) Int. Cl.
*H04J 3/06* (2006.01)
*H04W 56/00* (2009.01)
*H04W 76/02* (2009.01)

(52) U.S. Cl.
CPC ..... *H04W 56/0015* (2013.01); *H04W 76/023* (2013.01); *H04J 3/06* (2013.01)

(58) Field of Classification Search
None
See application file for complete search history.

(56) References Cited

U.S. PATENT DOCUMENTS

2012/0008618 A1  1/2012  Wang
2012/0093267 A1  4/2012  Zhou
(Continued)

FOREIGN PATENT DOCUMENTS

KR   10-2012-0073147 A    7/2012
WO   WO 2013/081393 A1    6/2013
(Continued)

OTHER PUBLICATIONS

"3rd Generation Partnership Project; Technical Specification Group Radio Access Network; Evolved Universal Terrestrial Radio Access (E-UTRA); Physical channels and modulation (Release 12)", 3GPP TS 36.211 V12.1.0, Mar. 2014, pp. 1-120, 3GPP.
(Continued)

*Primary Examiner* — Bob Phunkulh

(57) ABSTRACT

Exemplary embodiments provide a method and apparatus for transmitting a synchronization signal for Device-to-Device (D2D) communication in a wireless communication system. With respect to a D2D synchronization source to transmit a synchronization signal for D2D communication, the method includes: generating a D2D Synchronization Signal (D2DSS); and transmitting, by a synchronization source, the D2DSS to a D2D reception (Rx) UE, wherein the D2DSS includes a Primary D2D Synchronization Signal (PD2DSS) generated based on information associated with the synchronization source.

19 Claims, 6 Drawing Sheets

Related U.S. Application Data continuation of application No. 14/685,467, filed on Apr. 13, 2015, now Pat. No. 9,596,668.

(60) Provisional application No. 61/979,003, filed on Apr. 14, 2014.

(56) References Cited

U.S. PATENT DOCUMENTS

| | | |
|---|---|---|
| 2014/0029602 A1 | 1/2014 | Han |
| 2014/0099950 A1 | 4/2014 | Mildh |
| 2014/0120934 A1 | 5/2014 | Kishiyama |
| 2014/0169361 A1 | 6/2014 | Kim |
| 2014/0256369 A1 | 9/2014 | Ji |
| 2014/0323126 A1 | 10/2014 | Ro |
| 2014/0328329 A1 | 11/2014 | Novlan |
| 2015/0009949 A1 | 1/2015 | Khoryaev |
| 2015/0016354 A1 | 1/2015 | Yie |
| 2015/0016355 A1 | 1/2015 | Yie |
| 2015/0016356 A1 | 1/2015 | Yie |
| 2015/0016357 A1 | 1/2015 | Yie |
| 2015/0016358 A1 | 1/2015 | Yie |
| 2015/0043398 A1 | 2/2015 | Fwu |
| 2015/0351059 A1 | 12/2015 | Seo |
| 2016/0029333 A1 | 1/2016 | Seo |
| 2016/0037466 A1 | 2/2016 | Yang |
| 2016/0142898 A1 | 5/2016 | Poitau |

FOREIGN PATENT DOCUMENTS

| | | |
|---|---|---|
| WO | WO 2013/125887 A1 | 8/2013 |
| WO | WO 2013/125925 A1 | 8/2013 |
| WO | WO 2014/018333 A2 | 1/2014 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.1.0, Mar. 2014, pp. 1-356, 3GPP.

International Search Report for International Patent Application No. PCT/KR2014/007414, dated Dec. 29, 2014.

Written Opinion for International Patent Application No. PCT/KR2014/007414, dated Dec. 29, 2014.

METHOD AND APPARATUS FOR TRANSMITTING SYNCHRONIZATION SIGNAL FOR DEVICE TO DEVICE COMMUNICATION IN WIRELESS COMMUNICATION SYSTEM

CROSS-REFERENCE TO RELATED APPLICATIONS

This application is a continuation of a U.S. patent application Ser. No. 15/417,677, filed on Jan. 27, 2017, which is a continuation of a U.S. patent application Ser. No. 14/685,467, filed on Apr. 13, 2015, now issued as U.S. Pat. No. 9,596,668, which claims priority from and the benefit of U.S. Provisional Application No. 61/979,003, filed on Apr. 14, 2014, and Korean Patent Application No. 10-2014-0103977, filed on Aug. 11, 2014, which are incorporated herein by reference in their entirety.

BACKGROUND

1. Field

Exemplary embodiments relate to wireless communication, and more particularly, to a method and apparatus for transmitting a synchronization signal for Device to Device (D2D) communication in a wireless communication system.

2. Discussion of the Background

Device to Device (D2D) communication refers to a communication scheme that executes direct data transmission and reception between neighboring two User Equipments (UEs) without an evolved NodeB (eNodeB). That is, two UEs act as a source and a destination of data, and execute communication.

The D2D communication may be executed through a communication scheme that uses a non-licensed band such as a Wireless Local Area Network (LAN), Bluetooth, or the like. However, the communication scheme using the non-licensed band may have difficulty in providing planed and controlled services. In particular, the performance may be significantly deteriorated by interference.

Conversely, D2D communication that is operated or provided in a licensed-band or in an environment where inter-system interference is controlled, may support Quality of service (QoS) and may increase frequency utilization efficiency through frequency reusing and may increase a communication distance.

In the D2D communication in the licensed band, that is, in the cellular communication based-D2D communication, an eNodeB allocates resources of a UE, and the allocated resources may use a cellular uplink channel.

The D2D communication may include intra-cell D2D communication and inter-cell D2D communication. The inter-cell D2D communication may be embodied based on cooperative communication between two eNodeBs.

Therefore, there is desire for a method for effective use of resources and allocating a synchronization signal, for D2D communication services in the recent wireless communication system.

SUMMARY

One or more exemplary embodiments provide a method and apparatus for transmitting a synchronization signal for Device to Device (D2D) communication in a wireless communication system.

One or more exemplary embodiments provide a method and apparatus for configuring a synchronization signal in a wireless communication system that supports D2D communication.

One or more exemplary embodiments provide a method and apparatus for configuring a sequence of a synchronization signal that has good correlation.

One or more exemplary embodiments provide a method of transceiving a synchronization signal by a user equipment (UE) supporting a device-to-device (D2D) communication between UEs, the method including: receiving, at a first UE, a synchronization signal transmitted from a synchronization source; determining a root index based on the received synchronization signal; determining a synchronization timing reference based on the root index; and transmitting a synchronization signal for a D2D communication based on the determined synchronization timing reference. The determining of the synchronization timing reference includes: based on the root index, determining a category of the synchronization source; prioritizing the synchronization source based on determining whether the synchronization source is an evolved NodeB (eNodeB), a UE synchronized with an eNodeB, or a UE having a synchronization timing reference independent from an eNodeB; and determining the synchronization timing reference based on the prioritization.

One or more exemplary embodiments provide a method of transceiving a synchronization signal by a user equipment (UE) supporting a device-to-device (D2D) communication between UEs, the method including: receiving, at a UE, synchronization signals transmitted from different synchronization sources, respectively; prioritizing the different synchronization sources based on categories of the different synchronization sources, the categories including an evolved NodeB (eNodeB), a UE synchronized with an eNodeB, and a UE having a synchronization timing reference independent from an eNodeB; determining a reference synchronization source for the UE among the different synchronization sources; synchronizing with the reference synchronization source based on a synchronization timing reference associated with the reference synchronization source; and transmitting, from the UE, a signal based on the synchronization.

One or more exemplary embodiments provide a method of transceiving a synchronization signal by a user equipment (UE) supporting a device-to-device (D2D) communication between UEs, the method including: receiving, at a UE, synchronization signals transmitted from different synchronization sources, respectively; prioritizing the different synchronization sources based on the received synchronization signals; determining a reference synchronization source for the UE among the different synchronization sources; synchronizing with the reference synchronization source based on a synchronization timing reference associated with the reference synchronization source; and transmitting, from the UE, a signal to the reference synchronization source based on the synchronization. The determining of the reference synchronization source includes: determining a root index based on each synchronization signal received from the respective synchronization source; determining a category of the respective synchronization source based on the root index; prioritizing the different synchronization sources based on the corresponding categories; and determining the reference synchronization source based on the prioritization.

According to one or more exemplary embodiments, D2D synchronization information may be efficiently indicated based on an apparatus that transmits or receives a D2D signal. Therefore, D2D scheduling allocation (SA) and data information may be efficiently transmitted by securing efficiency of obtaining synchronization between User Equipments (UEs) inside or outside network coverage.

DETAILED DESCRIPTION OF THE ILLUSTRATED EMBODIMENTS

Figure 1:
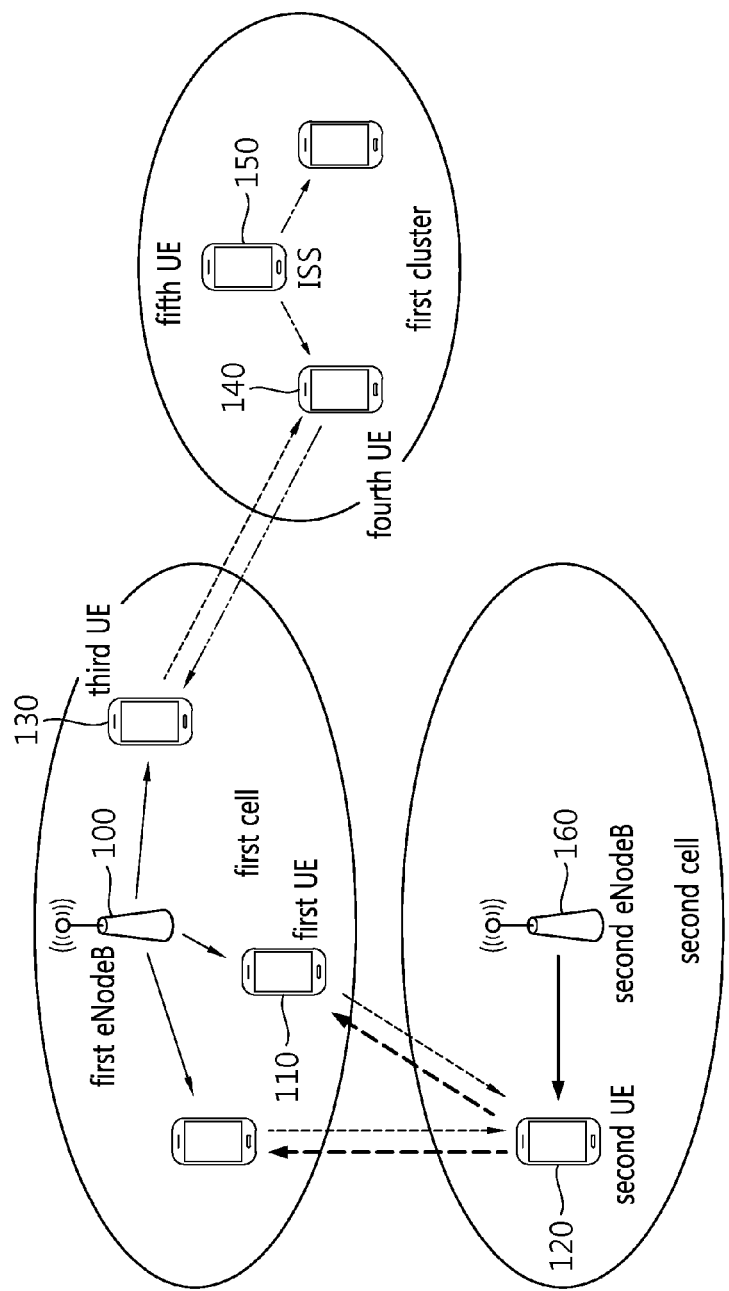
FIG. 1 is a diagram illustrating a concept of cellular network-based Device-to-Device (D2D) communication.

Hereinafter, exemplary embodiments of the present invention will be described with reference to the accompanying drawings. In the following description, the same elements will be designated by the same reference numerals although they are shown in different drawings. Further, in the following description, a detailed description of known functions and configurations incorporated herein will be omitted when it may make the subject matter of the present invention rather unclear.

The present specification provides descriptions in association with a communication network, and tasks executed in the communication network may be performed in the process where a system (for example, an evolved NodeB (eNodeB)) that manages the corresponding communication network controls a network and transmits data, or may be performed in a User Equipment (UE) that is linked to the corresponding network.

FIG. 1 is a diagram illustrating a concept of cellular network-based Device-to-Device (D2D) communication according to one or more exemplary embodiments.

Referring to FIG. 1, the communication between a first UE 110 located in a first cell and a second UE 120 located in a second cell may be D2D communication between a UE included in a network coverage and a UE included in the network coverage. In addition, the communication between a third UE 130 located in the first cell and a forth UE 140 located in a first cluster may be D2D communication between a UE included in a network coverage and a UE located outside the network coverage. The communication between the fourth UE 140 located in the first cluster and a fifth UE 150 located in the first cluster may be D2D communication between two UEs located outside the network coverage.

D2D communication refers to a technology that enables direct transmission and reception of data between UEs. Hereinafter, a UE described in exemplary embodiments is assumed to support D2D communication. When UEs located close to a cellular system execute D2D communication, loads on an evolved NodeB (eNodeB) may be dispersed. In addition, when UEs execute D2D communication, a UE executes data transmission with respect to a relatively short distance, and thus, transmission power consumption and transmission latency of the UE may decrease. In addition, from the perspective of the whole system, the existing cellular-based communication and the D2D communication use identical resources and thus, frequency utilization efficiency may be improved.

The D2D communication may be classified into a communication method of a UE located in a network coverage (base station coverage) and a communication method of a UE located outside a network coverage (base station coverage). The D2D communication may include a discovery process that executes discovery for communication between UEs and a direct communication process in which UEs transmits and receives control data and/or traffic data. The D2D communication may be used for various purposes. For example, D2D in a network coverage may be used for public safety and non-public safety such as commercial purposes or the like. The D2D communication executed outside a network coverage may be used for only the public safety.

A D2D synchronization source may indicate a node that transmits at least a D2D synchronization signal (D2DSS). The D2D synchronization source may transmit at least one D2DSS. The transmitted D2DSS may be used by a UE to obtain time-frequency synchronization. When the D2D synchronization source is an eNodeB, a D2DSS transmitted by the D2D synchronization source may include a Synchronization Signal (SS) identical to a Primary Synchronization Signal (PSS) and a Secondary Synchronization Signal (SSS). A D2DSS transmitted by a D2D synchronization source which is different from an eNodeB, may include a signal described in this disclosure. For example, when a D2D synchronization source is a UE, a broadcasting UE, a cluster head, a synchronization head, or the like, a D2DSS which is modified from a PSS (hereinafter referred to as a PD2DSS) or a D2DSS that is modified from an SSS (hereinafter referred to as an SD2DSS) may include a signal described in this disclosure. The cluster header may include an Independent Synchronization Source (ISS) for synchronization of an out-of-coverage UE, or may operate as an ISS.

A D2DSS transmitted by the D2D synchronization source may include an identity (ID) of the D2D synchronization source and/or a type of a D2D synchronization source. In addition, the D2DSS may include at least a Primary Device to Device Synchronization Signal (PD2DSS) and a Secondary Device to Device Synchronization Signal (SD2DSS). The PD2DSS is based on a Zadoff Chu sequence.

A sequence d(n) used for the PSS may be generated from a frequency domain Zadoff Chu sequence based on Equation 1.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{[Equation 1]}$$

In Equation 1, u denotes a root sequence index defined by Table 1.

TABLE 1

| $N_{ID}^{(2)}$ | Root index u |
|---|---|
| 0 | 25 |
| 1 | 29 |
| 2 | 34 |

The sequence d(n) may be mapped to a Resource Element (RE), based on Equation 2.

$$a_{k,l} = d(n), n = 0, \ldots, 61$$ [Equation 2]

$$k = n - 31 + \frac{N_{RB}^{DL} N_{sc}^{RB}}{2}$$

Here, $a_{k,l}$ denotes an RE, k denotes a subcarrier number, and l denotes an OFDM symbol number.

Mapping of a sequence used for the PSS to REs is determined based on a frame structure.

In the case of frame structure type 1 for Frequency Division Duplex (FDD), a PSS is mapped to the last OFDM symbol in slots 1 and 10 in a single radio frame.

In the case of frame structure type 2 for Time Division Duplex (TDD), a PSS is mapped to the third OFDM symbol in subframes 1 and 6 in a single radio frame.

Here, a single radio frame includes 10 subframes (subframes 0 to 9), and this may correspond to 20 slots (slots 0 to 19) when a single subframe is formed of two slots. In addition, a single slot includes a plurality of OFDM symbols.

An RE corresponding to Equation 3 from among REs (k, l) of OFDM symbols may not be used but may be reserved for transmission of a PSS.

$$k = n - 31 + \frac{N_{RB}^{DL} N_{sc}^{RB}}{2}$$ [Equation 3]

$$n = -5, -4, \ldots, -1, 62, 63, \ldots 66$$

A sequence $d(0), \ldots, d(61)$ used for an SSS may be generated by interleaving two binary sequences having a length of 31.

The combination of two binary sequences having a length of 31, which defines the SSS, may have different values between a subframe 0 and a subframe 5, based on Equation 4.

$$d(2n) = \begin{cases} s_0^{(m_0)}(n)c_0(n) & \text{in subframe 0} \\ s_1^{(m_1)}(n)c_0(n) & \text{in subframe 5} \end{cases}$$ [Equation 4]

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

In Equation 4, n has a value that satisfies $0 \leq n \leq 30$. $m_0$ and $m_1$ may be obtained from a physical layer cell identity (ID) group based on Equation 5.

$$m_0 = m' \bmod 31$$ [Equation 5]

$$m_1 = (m_0 + \lfloor m'/31 \rfloor + 1) \bmod 31$$

$$m' = N_{ID}^{(1)} + q(q+1)/2,$$

$$q = \left\lfloor \frac{N_{ID}^{(1)} + q'(q'+1)/2}{30} \right\rfloor, q' = \lfloor N_{ID}^{(1)}/30 \rfloor$$

Result values of Equation 5 may be expressed, as listed in Table 2 and Table 3.

TABLE 2

| $N_{ID}^{(1)}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |

TABLE 2-continued

| $N_{ID}^{(1)}$ | $m_0$ | $m_1$ |
|---|---|---|
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |

TABLE 3

| $N_{ID}^{(1)}$ | $m_0$ | $m_1$ |
|---|---|---|
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |

TABLE 3-continued

| $N_{ID}^{(1)}$ | $m_0$ | $m_1$ |
|---|---|---|
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |
| — | — | — |

Two sequences $s_0^{(m_0)}(n)$ and $s_1^{(m_1)}(n)$ may be defined as two different cyclic shifts of an m-sequence $\tilde{s}(n)$, based on Equation 6.

$$s_0^{(m_0)}(n)=\tilde{s}((n+m_0)\bmod 31)$$

$$s_1^{(m_1)}(n)=\tilde{s}((n+m_1)\bmod 31) \quad \text{[Equation 6]}$$

Equation 6 satisfies $\tilde{s}(i)=1-2x(i)$ and $0\le i\le 30$, and $x(i)$ may be defined by Equation 7.

$$x(\bar{i}+5)=(x(\bar{i}+2)+x(\bar{i}))\bmod 2, 0\le \bar{i}\le 25 \quad \text{[Equation 7]}$$

In Equation 7, the initial value of $x(i)$ may be set to $x(0)=0, x(1)=0, x(2)=0, x(3)=0, x(4)=1$.

$c_0(n)$ and $c_1(n)$, which are two scrambling sequences, may be determined based on a PSS, and may be defined by two different cyclic shifts of an m-sequence $\tilde{c}(n)$ based on Equation 8.

$$c_0(n)=\tilde{c}((n+N_{ID}^{(2)})\bmod 31)$$

$$c_1(n)=\tilde{c}((n+N_{ID}^{(2)}+3)\bmod 31) \quad \text{[Equation 8]}$$

In Equation 8, $N_{ID}^{(2)}\in\{0,1,2\}$ is a physical layer ID in a physical layer cell ID group $N_{ID}^{(1)}$, Equation 8 satisfies $\tilde{c}(i)=1-2x(i)$ and $0\le i\le 30$, and $x(i)$ is defined by Equation 9.

$$x(\bar{i}+5)=(x(\bar{i}+3)+x(\bar{i}))\bmod 2, 0\le \bar{i}\le 25 \quad \text{[Equation 9]}$$

In Equation 9, the initial value of $x(i)$ may be set to $x(0)=0, x(1)=0, x(2)=0, x(3)=0, x(4)=1$.

Scrambling sequences $z_1^{(m_0)}(n)$ and $z_1^{(m_1)}(n)$ may be defined by a cyclic shift of an m-sequence $\tilde{z}(n)$ based on Equation 10.

$$z_1^{(m_0)}(n)=\tilde{z}((n+(m_0 \bmod 8))\bmod 31)$$

$$z_1^{(m_1)}(n)=\tilde{z}((n+(m_1 \bmod 8))\bmod 31) \quad \text{[Equation 10]}$$

In Equation 10, $m_0$ and $m_1$ may be obtained through Table 2, and satisfy $\tilde{z}(i)=1-2x(i)$ and $0\le i\le 30$, and $x(i)$ may be defined by Equation 11.

$$x(\bar{i}+5)=(x(\bar{i}+4)+x(\bar{i}+2)+x(\bar{i}+1)+x(\bar{i}))\bmod 2, 0\le \bar{i}\le 25 \quad \text{[Equation 11]}$$

In Equation 11, the initial condition of $x(i)$ may be set to $x(0)=0, x(1)=0, x(2)=0, x(3)=0, x(4)=1$.

Mapping of a sequence used for the SSS to REs is determined based on a frame structure.

The sequence $d(n)$ may be mapped to REs based on Equation 12.

$$a_{k,l} = d(n), n = 0, \ldots, 61 \quad \text{[Equation 12]}$$

$$k = n - 31 + \frac{N_{RB}^{DL} N_{sc}^{RB}}{2}$$

$$l = \begin{cases} N_{symb}^{DL} - 2 & \text{in slots 0 and 10 for frame structure type 1} \\ N_{symb}^{DL} - 1 & \text{in slots 1 and 11 for frame structure type 2} \end{cases}$$

In Equation 12, $a_{k,l}$ denotes an RE, k denotes a subcarrier number, and l denotes an OFDM symbol number.

An RE corresponding to Equation 13 from among REs (k, l) of OFDM symbols may not be used but may be reserved for transmission of an SSS.

$$k = n - 31 + \frac{N_{RB}^{DL} N_{sc}^{RB}}{2} \quad \text{[Equation 13]}$$

$$l = \begin{cases} N_{symb}^{DL} - 2 & \text{in slots 0 and 10} & \text{for frame structure type 1} \\ N_{symb}^{DL} - 1 & \text{in slots 1 and 11} & \text{for frame structure type 2} \end{cases}$$

$$n = -5, -4, \ldots, -1, 62, 63, \ldots 66$$

A D2DSS transmitted by a D2D synchronization source may include a Physical Synchronization Source Identity (PSSID) and/or a type of a D2D synchronization source and a PD2DSS. The PD2DSS is based on a Zadoff Chu sequence.

For a D2DSS, a PD2DSS may need to be defined. When a D2D synchronization source is an eNodeB, a D2DSS may be identical to a PSS/SSS. However, when a D2D synchronization source is different from an eNodeB, a new type of PD2DSS needs to be defined.

It should be avoided that UEs erroneously interpret a D2DSS that is transmitted by a D2D synchronization source that is different from an eNodeB, as typical DL synchronization signals such as a PSS or an SSS. If a UE misinterprets received D2DSS as a DL synchronization signal typically transmitted from an eNodeB, the D2D synchronization source, which transmitted the D2DSS, may be erroneously recognized as an eNodeB by the UE or synchronization information may be incorrectly recognized by the UE. Therefore, a sequence used by the D2DSS should be different from a sequence that is used in the cellular communication (or a sequence for a PSS or an SSS). To this end, a sequence of which a root index is different from a sequence of a cellular communication may be defined and used.

When a D2D synchronization source is an eNodeB, a PD2DSS transmitted by the synchronization source is a PSS (Primary Synchronization Signal). When a D2D synchronization source is different from the eNodeB, a PD2DSS transmitted by the synchronization source may be defined based on the features described herein. The PD2DSS may incorporate one or more features of the PSS. For example, when the D2D synchronization source is a UE, a broadcasting UE, a cluster head, a synchronization head, or the like, a D2DSS which is modified from a PSS (hereinafter referred to as a PD2DSS) may be configured.

When a D2D synchronization source is different from an eNodeB, one or more exemplary embodiments may provide a method of generating a sequence of a PD2DSS transmitted by the D2D synchronization source, using one of additional three root indices in addition to general three root indices defined for a PSS. For example, the root indices of Table 4 may be used.

TABLE 4

| Example No. | Root Index |
|---|---|
| Example 1 | 38, 26, 37 |
| Example 2 | 38, 23, 40 |
| Example 3 | 38, 19, 44 |
| Example 4 | 38, 16, 47 |
| Example 5 | 38, 5, 58 |
| Example 6 | 38, 2, 61 |

According to one or more exemplary embodiments, a transmission D2D synchronization source may be defined as a node that transmits a D2D direct synchronization signal to a UE, and may also be referred to as a transmission (Tx) synchronization source. For example, in FIG. 1, a transmission synchronization source for the first UE 110 may be a first eNodeB 100, and a transmission synchronization source for the second UE 120 may be the first UE 110 or a second eNodeB 160.

According to one or more exemplary embodiments, an original D2D synchronization source may be defined as a node that originate a D2D synchronization signal, and may also be referred to as an original synchronization source. For example, in FIG. 1, an original synchronization source for the second UE 120 may be the first eNodeB 100 or the second eNodeB 160.

According to one or more exemplary embodiments, an Independent Synchronization Source (ISS) may be defined as a D2D synchronization source which is not an eNodeB but generates a D2D synchronization signal by itself. For example, In FIG. 1, the fifth UE 150 may be an ISS.

According to one or more exemplary embodiments, a hop count indicates the number of stages in which a synchronization signal is transmitted from a synchronization source to a UE, and may be increased by 1 for each stage. Referring to FIG. 1, when the eNodeB 100 transmits a synchronization signal to the second UE 120 through the first UE 110, a hop count to the first UE 110 is 1 and a hop count to the second UE 120 is 2.

A stratum level indicates the number of stages in which a synchronization signal is transmitted from a synchronization source recognized by a system to a UE. The stratum level may be identical to a hop count, and may be smaller than the hop count when a hop count that is not recognized by a system exists.

A PD2DSCH indicates a physical D2D synchronization channel, and according to one or more exemplary embodiments, the PD2DSCH may be used to indicate information, such as, a type of a synchronization source, a Physical Synchronization Source Identity (PSSID), or a stratum level.

A cell ID may include a plurality of unique physical layer cell IDs, for example, 504 physical layer cell IDs. The physical layer cell IDs $N_{ID}^{cell}$ may be grouped into 168 unique physical layer cell ID groups, and each group includes three unique IDs. Therefore, a physical layer cell ID may have a unique value defined by $N_{ID}^{cell}=3N_{ID}^{(1)}+N_{ID}^{(2)}$ which is an integer in a range from 0 to 167 expressing a physical layer cell ID group and $N_{ID}^{(1)}$ which is an integer in a range from 0 to 2 expressing a physical layer ID in a physical layer cell ID group, as shown in $N_{ID}^{(2)}$.

Embodiments provided below describe a method of transmitting synchronization information such as the type of synchronization source, a Physical Synchronization Source Identity (PSSID), a stratum level, or the like, through use of a PD2DSS, an SD2DSS, the location of a D2DSS in a subframe, and a PD2DSCH.

Figure 2:
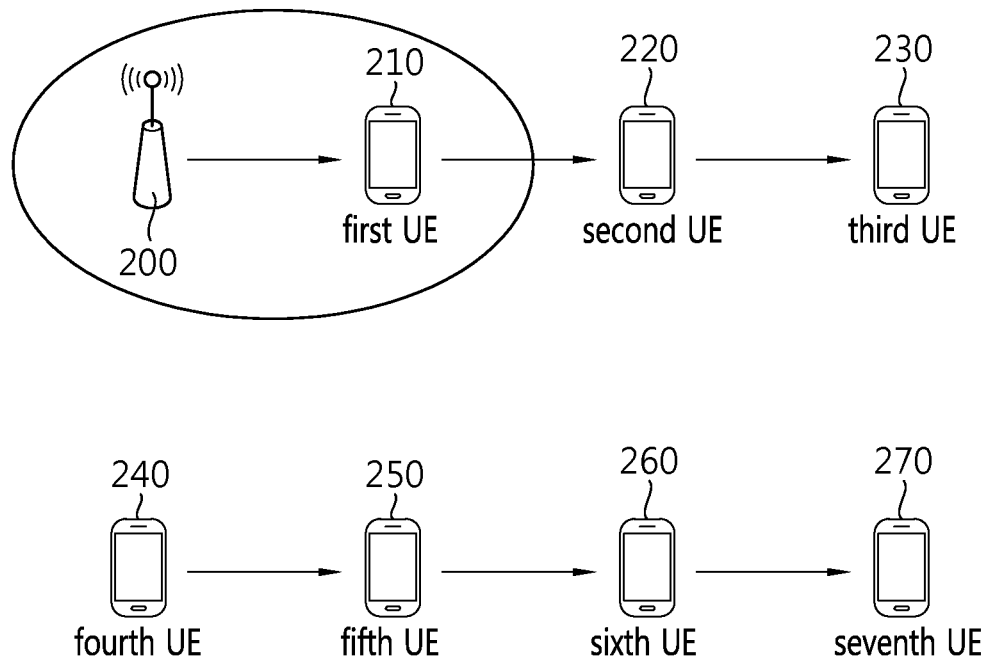
FIG. 2 is a conceptual diagram of a system to which a method of transmitting a synchronization signal is applied according to one or more exemplary embodiments.

FIG. 2 is a conceptual diagram of a system to which a method of transmitting a synchronization signal is applied according to one or more exemplary embodiments. The upper portion of FIG. 2 illustrates synchronization signal transmissions executed from an eNodeB 200 to a first UE, from the first UE 210 to a second UE 220, and from the second UE 220 to a third UE 230, respectively. The eNodeB 200 may be an original Synchronization Source (original SS) for the first UE 210, the second UE 220, and the third UE 230. The eNodeB 200 may be a transmission synchronization source (Tx SS) for the first UE 210, the first UE 210 may be a Tx SS for the second UE 220, and the second UE 220 may be a Tx SS for the third UE 230.

Referring to the lower portion of FIG. 2, a fourth UE 240 may not receive a synchronization signal from an eNodeB or another UE, but generate a synchronization signal by itself and transmit the same to another UE, and thus, the fourth UE 240 corresponds to an ISS. The fourth UE 240 may transmit a synchronization signal to a fifth UE 250, and the fifth UE 250 transmits a synchronization signal to a sixth UE 260, and the sixth UE 260 transmits a synchronization signal to a seventh UE 270, respectively. The fourth UE 240 may be an original Synchronization Source (original SS) for the fifth UE 250, the sixth UE 260, and the seventh UE 270. The fourth UE 240 may be a transmission synchronization source (Tx SS) for the fifth UE 250, the fifth UE 250 may be a Tx SS for the sixth UE 260, and the sixth UE 260 may be a Tx SS for the seventh UE 270.

Referring to FIG. 2, a stratum level when a synchronization signal departing from the eNodeB 200 is transmitted to the first UE 210, is referred to as a first stratum, and a stratum level when the synchronization signal is transmitted to the second UE 220 via the first UE 210, is referred to as a second stratum. In the same manner, a stratum level when the synchronization signal is transmitted to the third UE 230 via the first UE 210 and the second UE 220, is referred to as a third stratum.

One or more exemplary embodiments presented herein may be modified or varied by incorporating one or more features from other exemplary embodiments or configurations not explicitly described in this disclosure.

Embodiments 1-1 to 1-5 describe a method of indicating D2D synchronization information when the maximum stratum level is a third stratum in the case where an original synchronization source is an eNodeB, and when the maximum stratum level is a third stratum in the case where the original synchronization source is an ISS.

Embodiment 1-1

TABLE 5

| case | Type of SS | | | Stratum level |
| --- | --- | --- | --- | --- |
| | Tx SS | original SS | PSSID | (hop count) |
| case 1: eNodeB→UE$_1$ | eNodeB | eNodeB | PCID of eNodeB | $1^{st}$ (Index 0 (or 1)) |
| case 2: eNodeB→UE$_1$→UE$_2$ | SS relaying eNodeB UE(=UE$_1$) | eNodeB | PCID of eNodeB | $2^{nd}$ (Index 1 (or 2)) |
| case 3: eNodeB→UE$_1$→UE$_2$→UE$_3$ | SS relaying eNodeB UE(=UE$_2$) | eNodeB | PCID of eNodeB | $3^{rd}$ (Index 2 (or 3)) |
| case 4: ISS(=UE$_A$)→UE$_B$ | ISS UE(=UE$_A$) | ISS(=UE$_A$) | based on ISS(=UE$_A$) ID | $1^{st}$ (Index 0 (or 1)) |
| case5: ISS(=UE$_A$)→UE$_B$→UE$_C$ | SS relaying ISS UE(=UE$_B$) | ISS(=UE$_A$) | based on ISS(=UE$_A$) ID | $2^{nd}$ (Index 1 (or 2)) |
| case 6: ISS(=UE$_A$)→UE$_B$→UE$_C$→UE$_D$ | SS relaying ISS UE(=UE$_C$) | ISS(=UE$_A$) | based on ISS(=UE$_A$) ID | $3^{rd}$ (Index 2 (or 3)) |

In the present embodiment, when a type of a Synchronization Source (SS) is an eNodeB or an SS derived from an eNodeB (an SS relaying an eNodeB), a PCID of an eNodeB may be used as a Physical Synchronization Source Identity (PSSID), and 504 unique PSSIDs may exist.

When a type of a Synchronization Source (SS) is an ISS or an SS derived from an ISS (an SS relaying an ISS), a PSSID based on a UE ID of the ISS may be used and 504 unique PSSIDs may exist.

In the present embodiment, a type of a transmission synchronization source may be indicated by a root index value of a PD2DSS. For example, the cases of Table 5 may be classified into two cases, that is, a case corresponding to Case 1 in which a transmission synchronization source is an eNodeB and the other case corresponding to Cases 2 to 6 in which a transmission synchronization source is a UE, and each case may be indicated by a root index value of a PD2DSS. A PD2DSS when the transmission synchronization source is an eNodeB, may use 25, 29, and 34, which are identical to the root indices of a PSS. A PD2DSS when the transmission synchronization source is a UE, may use newly defined root indices which are different from the root indices of a PSS. For example, the root indices of Table 4 may be used.

When the transmission synchronization source is a UE, a type of an original synchronization source may be indicated by a Physical D2D Synchronization Channel (PD2DSCH). For example, the cases of Table 5 may be indicated based on the classification into two cases, that is, a case corresponding to Cases 2 and 3 in which a type of an original synchronization source is an eNodeB and the other case corresponding to Cases 4 to 6 in which a type of an original synchronization source is an Independent Synchronization Source (ISS). Therefore, an indication value of the PD2DSCH may have a one-bit value. When the transmission synchronization source is an eNodeB, it may be recognized that the original synchronization source is the eNodeB, through a root index value of the PD2DSS, and thus, this may not need to be indicated separately.

In addition, when the transmission synchronization source is a UE, a stratum level may be indicated by a location where a D2DSS is transmitted in a frequency-resource domain or a PD2DSCH. For example, the cases of Table 5 may be indicated based on the classification into three cases, that is, a case corresponding to Case 4 in which a stratum level is 1, another case corresponding to Cases 2 and 5 in which a stratum level is 2, and the other case corresponding to Cases 3 and 6 in which a stratum level is 3. In this instance, therefore, an indication value of the PD2DSCH may have a two-bit value. When the transmission synchronization source is an eNodeB, the stratum level may be recognized through a root index value of the PD2DSS, and thus, this may not need to be indicated separately.

When a type of the synchronization source is an eNodeB, a physical layer cell ID ($N_{ID}^{cell}$) corresponding to a PCID of the eNodeB may be used as a Physical Synchronization Source Identity (PSSID). The physical layer cell ID may be expressed as $N_{ID}^{cell}=3N_{ID}^{(1)}+N_{ID}^{(2)}$, and $N_{ID}^{(2)}$ may be mapped in one-to-one correspondence to root indices of the PD2DSS that may have three values, and may have an integer in a range from 0 to 2. In this instance, the root index of the PD2DSS may have one of 25, 29, and 34, which are identical to the root indices of the PSS. Ng) may be mapped in one-to-one correspondence to root indices of an SD2DSS that may have 168 values, and may have an integer in a range from 0 to 167. In this instance, a value that is identical to the SSS may be used as the value of the SD2DSS.

Even when the type of the synchronization source is a synchronization source derived from an eNodeB, a Physical Synchronization Source Identity (PSSID) may have a value identical to a PCID of an eNodeB, and 504 unique PSSIDs may exist. The PSSID may be expressed as $N_{ID}^{D2D}=3N_{ID}^{(1)}+N_{ID}^{(2)}$, and $N_{ID}^{(2)}$ may be mapped in one-to-one correspondence to root indices of a PD2DSS that may have three values, and may have an integer in a range from 0 to 2. In this instance, newly defined root indices which are different from the root indices of the PSS may be used as a root index of the PD2DSS, and for example, the root indices of Table 4 may be used. For $N_{ID}^{(1)}$, a value of an SD2DSS that is mapped in one-to-one correspondence to an SSS having 168 sequences may be used. Therefore, the SD2DSS may have an integer in a range from 0 to 167, and a PSSID may be mapped to 504(=3*168) IDs.

When the type of the synchronization source is an ISS or a synchronization source derived from an ISS, a Proximity based Services (ProSe) UE ID of a UE corresponding to the ISS may be used as a Physical Synchronization Source Identity (PSSID), and the PSSID may be mapped to 504 IDs based on a predetermined mapping rule. The PSSID may be expressed as $N_{ID}^{D2D}=3N_{ID}^{(1)}+N_{ID}^{(2)}$, and $N_{ID}^{(2)}$ may be mapped in one-to-one correspondence to root indices of the PD2DSS that may have three values, and may have an integer in a range from 0 to 2. In this instance, newly defined root indices which are different from the root indices of the PSS may be used as a root index of the PD2DSS, and for example, the root indices of Table 4 may be used. $N_{ID}^{(1)}$ associated with the SD2DSS may be mapped in one-to-one correspondence to an SSS having 168 sequences and may have an integer in a range from 0 to 167. Therefore, the PSSID may be mapped to 504(=3*168) IDs.

Embodiment 1-2

TABLE 6

| case | Type of SS | | | Stratum level |
| --- | --- | --- | --- | --- |
| | Tx SS | Original SS | PSSID | (hop count) |
| case 1: eNodeB→UE$_1$ | eNodeB | eNodeB | PCID of eNodeB | $1^{st}$ (Index 0 (or 1)) |
| case 2: eNodeB→UE$_1$→UE$_2$ | SS relaying eNodeB UE(=UE$_1$) | eNodeB | PCID based on of eNodeB | $2^{nd}$ (Index 1 (or 2)) |
| case 3: eNodeB→UE$_1$→UE$_2$→UE$_3$ | SS relaying eNodeB UE(=UE$_2$) | eNodeB | PCID based on of eNodeB | $3^{rd}$ (Index 2 (or 3)) |
| case 4: ISS(=UE$_A$)→UE$_B$ | ISS UE(=UE$_A$) | ISS(=UE$_A$) | based on ISS(=UE$_A$) ID | $1^{st}$ (Index 0 (or 1)) |
| case 5: ISS(=UE$_A$)→UE$_B$→UE$_C$ | SS relaying ISS UE(=UE$_B$) | ISS(=UE$_A$) | based on ISS(=UE$_A$) ID | $2^{nd}$ (Index 1 (or 2)) |
| case 6: ISS(=UE$_A$)→UE$_B$→UE$_C$→UE$_D$ | SS relaying ISS UE(=UE$_C$) | ISS(=UE$_A$) | based on ISS(=UE$_A$) ID | $3^{rd}$ (Index 2 (or 3)) |

In the present embodiment, when the type of the Synchronization Source (SS) is an eNodeB, a PCID of the eNodeB may be used as a PSSID, and 504 unique PSSIDs may be used. When the type of the synchronization source is an SS derived from an eNodeB (an SS relaying an eNodeB), a value modified based on the PCID of the eNodeB may be used as a PSSID, and 168 or K unique PSSIDs may exist, wherein K is a value that is less than 168.

When the type of the Synchronization Source (SS) is an ISS or an SS derived from an ISS (an SS relaying an ISS), a PSSID may be determined based on a UE ID of the ISS, and 168 or K unique PSSIDs may exist, wherein K is a value that is less than 168.

In the present embodiment, a transmission synchronization source is indicated by a root index value of a PD2DSS and a stratum level when the transmission synchronization source is an eNodeB is 1 and thus, the stratum level may not need to be indicated separately.

When the transmission synchronization source is a UE, a stratum level may be indicated by a root index of a PD2DSS. For example, the cases of Table 6 may be indicated based on the classification into three cases, that is, a case corresponding to Case 4 in which a stratum level is 1, another case corresponding to Cases 2 and 5 in which a stratum level is 2, and the other case corresponding to Cases 3 and 6 in which a stratum level is 3. Therefore, when three newly defined root indices of a PD2DSS are X, Y, and Z, respectively, for example, a root index X may be set to indicate a stratum level 1, a root index Y may be set to indicate a stratum level 2, and a root index Z may be set to indicate a stratum level 3. The root indices of Table 4 may be used as the newly defined root indices of the PD2DSS.

When the type of the synchronization source is an eNodeB (Case 1), a physical layer cell ID ($N_{ID}^{cell}$) corresponding to a PCID of the eNodeB may be used as a Physical Synchronization Source Identity (PSSID). The physical layer cell ID may be expressed as $N_{ID}^{cell}=3N_{ID}^{(1)}+N_{ID}^{(2)}$, and $N_{ID}^{(2)}$ may be mapped in one-to-one correspondence to root indices of the PD2DSS that may have three values, and may have an integer in a range from 0 to 2. In this instance, the root index of the PD2DSS may have one of 25, 29, and 34, which are identical to the root indices of the PSS. $N_{ID}^{(1)}$ may be mapped in one-to-one correspondence to root indices of an SD2DSS that may have 168 values, and may have an integer in a range from 0 to 167. In this instance, a value that is identical to the SSS may be used as the value of the SD2DSS.

When the type of the synchronization source is a synchronization source derived from an eNodeB (an SS relaying an eNodeB) (Cases 2 and 3), a Physical Synchronization Source Identity (PSSID) may be mapped to 168 or K IDs based on a PCID of the eNodeB using a predetermined rule, wherein K is a value that is less than 168. Therefore, the PSSID may have a value in a range from 0 to 167 or in a range from 0 to K−1. The PSSID may be expressed as $N_{ID}^{D2D}=N_{ID}^{(1)}$, and $N_{ID}^{(1)}$ associated with the SD2DSS may be mapped in one-to-one correspondence to an SSS that may have 168 values, and may have an integer in a range from 0 to 167, or may be mapped in one-to-one correspondence to K values, based on sequences that are modified or partially selected from an SSS having 168 sequences and may have an integer in a range from 0 to K−1, wherein K is a value less than 168. In this instance, an accurate PCID of the eNodeB may be transmitted through a PD2DSCH.

When the type of the synchronization source is an ISS or a synchronization source derived from an ISS (Cases 4, 5, and 6), a Proximity based Services (ProSe) UE ID of a UE corresponding to the ISS may be used as a Physical Synchronization Source Identity (PSSID), and the PSSID may be mapped to 168 or K IDs based on a predetermined mapping rule, wherein K is a value that is less than 168. Therefore, the PSSID may have a value in a range from 0 to 167 or in a range from 0 to K−1. The PSSID may be expressed as $N_{ID}^{D2D}=N_{ID}^{(1)}$, and $N_{ID}^{(1)}$ associated with the SD2DSS may be mapped in one-to-one correspondence to an SSS that may have 168 values, and may have an integer in a range from 0 to 167, or may be mapped in one-to-one correspondence to K values, based on sequences that are modified or partially selected from an SSS having 168 sequences and may have an integer in a range from 0 to K−1, wherein K is a value less than 168. In this instance, an accurate UE ID of the ISS may be transmitted through a PD2DSCH.

Embodiment 1-3

TABLE 7

| | Type of SS | | | Stratum level |
|---|---|---|---|---|
| case | Tx SS | Original SS | PSSID | (hop count) |
| Case 1: eNodeB→UE₁ | eNodeB | eNodeB | PCID of eNodeB | 1st (Index 0 (or 1)) |
| Case 2: eNodeB→UE₁→UE₂ | SS relaying eNodeB UE(=UE₁) | eNodeB | PCID of eNodeB | 2nd (Index 1 (or 2)) |
| Case 3: eNodeB→UE₁→UE₂→UE₃ | SS relaying eNodeB UE(=UE₂) | eNodeB | PCID of eNodeB | 3rd (Index 2 (or 3)) |
| Case 4: ISS(=UE_A)→UE_B | ISS UE(=UE_A) | ISS(=UE_A) | Based on ISS(=UE_A) ID | 1st (Index 0 (or 1)) |
| Case 5: ISS(=UE_A)→UE_B→UE_C | SS relaying ISS UE(=UE_B) | ISS(=UE_A) | Based on ISS(=UE_A) ID | 2nd (Index 1 (or 2)) |
| Case 6: ISS(=UE_A)→UE_B→UE_C→UE_D | SS relaying ISS UE(=UE_C) | ISS(=UE_A) | Based on ISS(=UE_A) ID | 3rd (Index 2 (or 3)) |

In the present embodiment, when a type of a Synchronization Source (SS) is an eNodeB or an SS derived from an eNodeB (an SS relaying an eNodeB), a PCID of an eNodeB may be used as a Physical Synchronization Source Identity (PSSID), and 504 unique PSSIDs may exist.

When the type of the Synchronization Source (SS) is an ISS or an SS derived from an ISS (an SS relaying an ISS), a PSSID based on a UE ID of the ISS may be used, and 168 or K unique PSSIDs may exist, wherein K is a value that is less than 168.

In the present embodiment, a type of a transmission synchronization source may be indicated by a root index value of a PD2DSS. For example, cases of Table 7 may be classified into two cases, that is, a case corresponding to Case 1 in which a transmission synchronization source is an eNodeB and the other case corresponding to Cases 2 to 6 in which a transmission synchronization source is a UE, and each case may be indicated by a root index value of a PD2DSS. A PD2DSS when the transmission synchronization source is an eNodeB, may use 25, 29, and 34, which are identical to the root indices of a PSS. A PD2DSS when the transmission synchronization source is a UE may use newly defined root indices which are different from the root indices of a PSS. For example, the root indices of Table 4 may be used.

When the transmission synchronization source is a UE, a type of an original synchronization source may be indicated by a Physical D2D Synchronization Channel (PD2DSCH). For example, the cases of Table 7 may be indicated based on the classification into two cases, that is, a case corresponding to Cases 2 and 3 in which a type of an original synchronization source is an eNodeB and a case corresponding to Cases 4 to 6 in which a type of an original synchronization source is an Independent Synchronization Source (ISS). Therefore, an indication value of the PD2DSCH may have a 1-bit value. When the transmission synchronization source is an eNodeB, it may be recognized that the original synchronization source is the eNodeB, through a root index value of the PD2DSS, and thus, this may not need to be indicated separately.

In addition, when the original synchronization source is an eNodeB and the transmission synchronization source is a UE, a stratum level may be indicated by a location where a D2DSS is transmitted in a frequency-resource domain or a PD2DSCH. For example, cases of Table 7 may be indicated based on the classification into two cases, that is, a case corresponding to Case 2 in which a stratum level is 2 and a case corresponding to Case 3 in which a stratum level is 3. Therefore, an indication value of the PD2DSCH may have a 1-bit value. Here, 1-bit information of the PD2DSCH may be designed to be different based on the coverage scenario, and the 1-bit information of the PD2DSCH may be designed to not be included in an out-of-coverage. Therefore, in Cases 4 to 6 in which the original synchronization source is an ISS, a stratum level may be indicated by a root index value of a PD2DSS, as opposed to by the PD2DSH. When the transmission synchronization source is an eNodeB, the stratum level may be recognized through a root index value of the PD2DSS, and thus, this may not need to be indicated separately.

When the original synchronization source is an ISS, a stratum level may be indicated by a root index of a PD2DSS. Cases 4 to 6 of Table 7 may be indicated based on the classification into a total of three cases, based on a stratum level. Therefore, when three newly defined root indices of a PD2DSS are X, Y, and Z, respectively, for example, a root index X may be set to indicate a stratum level 1, a root index Y may be set to indicate a stratum level 2, and a root index Z may be set to indicate a stratum level 3. The root indices of Table 4 may be used as the newly defined root indices of the PD2DSS.

When a type of the synchronization source is an eNodeB, a physical layer cell ID (N corresponding to a PCID of the eNodeB may be used as a Physical Synchronization Source Identity (PSSID). The physical layer cell ID may be expressed as $N_{ID}^{cell}=3N_{ID}^{(1)}+N_{ID}^{(2)}$, and $N_{ID}^{(2)}$ may be mapped in one-to-one correspondence to root indices of the PD2DSS that may have three values, and may have an integer in a range from 0 to 2. In this instance, the root index of the PD2DSS may have one of 25, 29, and 34, which are identical to the root indices of the PSS. $N_{ID}^{(1)}$ may be mapped in one-to-one correspondence to root indices of an SD2DSS that may have 168 values, and may have an integer in a range from 0 to 167. In this instance, a value that is identical to the SSS may be used as the value of the SD2DSS.

Even when the type of the synchronization source is a synchronization source derived from an eNodeB, a Physical Synchronization Source Identity (PSSID) may have a value identical to the PCID of the eNodeB, and 504 unique PSSIDs may exist. The PSSID may be expressed as $N_{ID}^{D2D}=3N_{ID}^{(1)}+N_{ID}^{(2)}$, and $N_{ID}^{(2)}$ may be mapped in one-to-one correspondence to root indices of the PD2DSS that may have three values, and may have an integer in a range from 0 to 2. In this instance, newly defined root indices which are different from the root indices of the PSS may be used as a root index of the PD2DSS, and for example, the root indices of Table 4 may be used. For $N_{ID}^{(1)}$, a value of an SD2DSS that is mapped in one-to-one correspondence to an SSS having 168 sequences may be used. Therefore, the SD2DSS may have an integer in a range from 0 to 167, and a PSSID may be mapped to 504(=3*168) IDs.

When the type of the synchronization source is an ISS or a synchronization source derived from an ISS (Cases 4, 5, and 6), a Proximity based Services (ProSe) UE ID of a UE corresponding to the ISS may be used as a Physical Synchronization Source Identity (PSSID), and the PSSID may be mapped to 168 or K IDs based on a predetermined mapping rule, wherein K is a value that is less than 168. Therefore, the PSSID may have a value in a range from 0 to 167 or in a range from 0 to K−1. The PSSID may be expressed as $N_{ID}^{D2D}=N_{ID}^{(1)}$, and $N_{ID}^{(1)}$ associated with the SD2DSS may be mapped in one-to-one correspondence to an SSS that may have 168 values, and may have an integer in a range from 0 to 167, or may be mapped in one-to-one correspondence to K values, based on sequences that are modified or partially selected from an SSS having 168 sequences and may have an integer in a range from 0 to K−1, wherein K is a value less than 168. In this instance, an accurate UE ID of the ISS may be transmitted through a PD2DSCH.

Embodiment 1-4

TABLE 8

| Case | Type of SS | | | Stratum level |
| | Tx SS | Original SS | PSSID | (hop count) |
|---|---|---|---|---|
| Case 1: eNodeB→UE$_1$ | eNodeB | eNodeB | PCID of eNodeB | 1$^{st}$ (Index 0 (or 1)) |
| Case 2: eNodeB→UE$_1$→UE$_2$ | SS relaying eNodeB UE(=UE$_1$) | eNodeB | Based on UE(=UE$_1$) ID | 2$^{nd}$ (Index 1 (or 2)) |
| Case 3: eNodeB→UE$_1$→UE$_2$→UE$_3$ | SS relaying eNodeB UE(=UE$_2$) | eNodeB | Based on UE(=UE$_2$) ID | 3$^{rd}$ (Index 2 (or 3)) |
| Case 4: ISS(=UE$_A$)→UE$_B$ | ISS UE(=UE$_A$) | ISS(=UE$_A$) | Based on UE(=UE$_A$) ID | 1$^{st}$ (Index 0 (or 1)) |
| Case 5: ISS(=UE$_A$)→UE$_B$→UE$_C$ | SS relaying ISS UE(=UE$_B$) | ISS(=UE$_A$) | Based on UE(=UE$_B$) ID | 2$^{nd}$ (Index 1 (or 2)) |
| Case 6: ISS(=UE$_A$)→UE$_B$→UE$_C$→UE$_D$ | SS relaying ISS UE(=UE$_C$) | ISS(=UE$_A$) | Based on UE(=UE$_C$) ID | 3$^{rd}$ (Index 2 (or 3)) |

In the present embodiment, when the type of the Synchronization Source (SS) is an eNodeB, a PCID of an eNodeB may be used as a Physical Synchronization Source Identity (PSSID), and 504 unique PSSIDs may exist.

When a type of a Synchronization Source (SS) is an SS derived from an eNodeB (an SS relaying an eNodeB), an ISS, or an SS derived from an ISS (an SS relaying an ISS), a PSSID based on a UE ID of a transmission synchronization source may be used, and 504 unique PSSIDs may exist.

In the present embodiment, a type of a transmission synchronization source may be indicated by a root index value of a PD2DSS. For example, cases of Table 8 may be classified into two cases, that is, a case corresponding to Case 1 in which a transmission synchronization source is an eNodeB and the other case corresponding to Cases 2 to 6 in which a transmission synchronization source is a UE, and each case may be indicated by a root index value of a PD2DSS. A PD2DSS when the transmission synchronization source is an eNodeB, may use 25, 29, and 34, which are identical to the root indices of a PSS A PD2DSS when the transmission synchronization source is a UE, may use newly defined root indices which are different from the root indices of a PSS. For example, the root indices of Table 4 may be used.

When the transmission synchronization source is a UE, a type of an original synchronization source may be indicated by a Physical D2D Synchronization Channel (PD2DSCH). For example, the cases of Table 8 may be indicated based on the classification into two cases, that is, a case corresponding to Cases 2 and 3 in which a type of an original synchronization source is an eNodeB and a case corresponding to Cases 4 to 6 in which a type of an original synchronization source is an Independent Synchronization Source (ISS). Therefore, an indication value of the PD2DSCH may have a one-bit value. When the transmission synchronization source is an eNodeB, it may be recognized that the original synchronization source is the eNodeB, through a root index value of the PD2DSS, and thus, this may not need to be indicated separately.

In addition, when the transmission synchronization source is a UE, a stratum level may be indicated by a location where a D2DSS is transmitted in a frequency-resource domain or a PD2DSCH. For example, the cases of Table 8 may be indicated based on the classification into three cases, that is, a case corresponding to Case 4 in which a stratum level is 1, another case corresponding to Cases 2 and 5 in which a stratum level is 2, and the other case corresponding to Cases 3 and 6 in which a stratum level is 3. Therefore, an indication value of the PD2DSCH may have a 2-bit value. When the transmission synchronization source is an eNodeB, the stratum level may be recognized through a root index value of the PD2DSS and thus, this may not need to be indicated separately.

When a type of the synchronization source is an eNodeB, a physical layer cell ID ($N_{ID}^{cell}$) corresponding to a PCID of the eNodeB may be used as a Physical Synchronization Source Identity (PSSID). The physical layer cell ID may be expressed as $N_{ID}^{cell}=3N_{ID}^{(1)}+N_{ID}^{(2)}$, and $N_{ID}^{(2)}$ may be mapped in one-to-one correspondence to root indices of the PD2DSS that may have three values, and may have an integer in a range from 0 to 2. In this instance, the root index of the PD2DSS may have one of 25, 29, and 34, which are identical to the root indices of the PSS. $N_{ID}^{(1)}$ may be mapped in one-to-one correspondence to root indices of an SD2DSS that may have 168 values, and may have an integer in a range from 0 to 167. In this instance, a value that is identical to the SSS may be used as the value of the SD2DSS.

When the type of the synchronization source is a synchronization source derived from an eNodeB (an SS relaying an eNodeB), an ISS, or a synchronization source derived from an ISS (an SS relaying an ISS), a Proximity based Services (ProSe) UE ID of a transmission (Tx) UE may be used as a Physical Synchronization Source Identity (PSSID), and the PSSID may be mapped to 504 IDs based on a predetermined mapping rule. The PSSID may be expressed as $N_{ID}^{D2D}=3N_{ID}^{(1)}+N_{ID}^{(2)}$, and $N_{ID}^{(2)}$ may be mapped in one-to-one correspondence to root indices of the PD2DSS that may have three values, and may have an integer in a range from 0 to 2. In this instance, newly defined root indices which are different from the root indices of the PSS may be used as a root index of the PD2DSS, and for example, the root indices of Table 4 may be used. $N_{ID}^{(1)}$ associated with the SD2DSS may be mapped in one-to-one correspondence to an SSS having 168 sequences and may have an integer in a range from 0 to 167. Therefore, the PSSID may be mapped to 504(=3*168) IDs.

Embodiment 1-5

TABLE 9

| Case | Type of SS | | | Stratum level (hop count) |
|---|---|---|---|---|
| | Tx SS | Original SS | PSSID | |
| Case 1: eNodeB→UE$_1$ | | eNodeB | PCID of eNodeB | 1$^{st}$ (Index 0 (or 1)) |
| Case 2: eNodeB→UE$_1$→UE$_2$ | eNodeB | eNodeB | | |
| | SS relaying eNodeB UE(=UE$_1$) | eNodeB | Based on UE(=UE$_1$) ID | 2$^{nd}$ (Index 1 (or 2)) |
| Case 3: eNodeB→UE$_1$→UE$_2$→UE$_3$ | SS relaying eNodeB UE(=UE$_2$) | eNodeB | Based on UE(=UE$_2$) ID | 3$^{rd}$ (Index 2 (or 3)) |
| Case 4: ISS(=UE$_A$)→UE$_B$ | | ISS | Based on UE(=UE$_A$) ID | 1$^{st}$ (Index 0 (or 1)) |
| | UE(=UE$_A$) | ISS(=UE$_A$) | | |
| Case 5: ISS(=UE$_A$)→UE$_B$→UE$_C$ | SS relaying ISS UE(=UE$_B$) | ISS(=UE$_A$) | Based on UE(=UE$_B$) ID | 2$^{nd}$ (Index 1 (or 2)) |
| Case 6: ISS(=UE$_A$)→UE$_B$→UE$_C$→UE$_D$ | SS relaying ISS UE(=UE$_C$) | ISS(=UE$_A$) | Based on UE(=UE$_C$) ID | 3$^{rd}$ (Index 2 (or 3)) |

In the present embodiment, when the type of the Synchronization Source (SS) is an eNodeB, a PCID of the eNodeB may be used as a Physical Synchronization Source Identity (PSSID), and 504 unique PSSIDs may exist.

When a type of a Synchronization Source (SS) is an SS derived from an eNodeB (an SS relaying an eNodeB), an ISS, or an SS derived from an ISS (an SS relaying an ISS), a PSSID based on a UE ID of a transmission synchronization source may be used, and 168 or K unique PSSIDs may exist, wherein K is a value less than 168.

In the present embodiment, a type of a transmission synchronization source may be indicated by a root index value of a PD2DSS. For example, cases of Table 9 may be classified into two cases, that is, a case corresponding to Case 1 in which a transmission synchronization source is an eNodeB and the other case corresponding to Cases 2 to 6 in which a transmission synchronization source is a UE, and each case may be indicated by a root index value of a PD2DSS. A PD2DSS when the transmission synchronization source is an eNodeB, may use 25, 29, and 34, which are identical to the root indices of a PSS A PD2DSS when the transmission synchronization source is a UE may use newly defined root indices which are different from the root indices of a PSS. For example, the root indices of Table 4 may be used.

When the transmission synchronization source is a UE, a type of an original synchronization source may be indicated by a Physical D2D Synchronization Channel (PD2DSCH). For example, the cases of Table 9 may be indicated based on the classification into two cases, that is, a case corresponding to Cases 2 and 3 in which a type of an original synchronization source is an eNodeB and a case corresponding to Cases 4 to 6 in which a type of an original synchronization source is an Independent Synchronization Source (ISS). Therefore, an indication value of the PD2DSCH may have a one-bit value. When the transmission synchronization source is an eNodeB, it may be recognized that the original synchronization source is the eNodeB, through a root index value of the PD2DSS, and thus, this may not need to be indicated separately.

When the transmission synchronization source is a UE, a stratum level may be indicated by a root index of a PD2DSS. For example, the cases of Table 9 may be indicated based on the classification into three cases, that is, a case corresponding to Case 4 in which a stratum level is 1, another case corresponding to Cases 2 and 5 in which a stratum level is 2, and the other case corresponding to Cases 3 and 6 in which a stratum level is 3.

Therefore, when three newly defined root indices of a PD2DSS are X, Y, and Z, respectively, for example, a root index X may be set to indicate a stratum level 1, a root index Y may be set to indicate a stratum level 2, and a root index Z may be set to indicate a stratum level 3. The root indices of Table 4 may be used as the newly defined root indices of the PD2DSS.

When a type of the synchronization source is an eNodeB, a physical layer cell ID ($N_{ID}^{cell}$) corresponding to a PCID of the eNodeB may be used as a Physical Synchronization Source Identity (PSSID). The physical layer cell ID may be expressed as $N_{ID}^{cell}=3N_{ID}^{(1)}+N_{ID}^{(2)}$, and $N_{ID}^{(2)}$ may be mapped in one-to-one correspondence to root indices of the PD2DSS that may have three values, and may have an integer in a range from 0 to 2. In this instance, the root index of the PD2DSS may have one of 25, 29, and 34, which are identical to the root indices of the PSS. $N_{ID}^{(1)}$ may be mapped in one-to-one correspondence to root indices of an SD2DSS that may have 168 values, and may have an integer in a range from 0 to 167. In this instance, a value that is identical to the SSS may be used as the value of the SD2DSS.

When the type of the synchronization source is a synchronization source derived from an eNodeB (an SS relaying an eNodeB), an ISS, or a synchronization source derived from an ISS (an SS relaying an ISS), a Proximity based Services (ProSe) UE ID of a transmission (Tx) UE may be used as a Physical Synchronization Source Identity (PSSID), and the PSSID may be mapped to 168 or K IDs based on a predetermined mapping rule, wherein K is a value less than 168. Therefore, the PSSID may have a value in a range from 0 to 167 or in a range from 0 to K−1. The PSSID may be expressed as $N_{ID}^{D2D}=N_{ID}^{(1)}$, and $N_{ID}^{(1)}$ associated with an SD2DSS may be mapped in one-to-one correspondences to an SSS having 168 sequences, or may be mapped to K sequences based on sequences modified or partially selected from the SSS having 168 sequences, wherein K is a value less than 168. When $N_{ID}^{(1)}$ is mapped in one-to-one correspondence to 168 sequences, it may have an integer value in a range from 0 to 167, and when it is mapped in one-to-one correspondence to K sequences, it may have an integer in a range from 0 to K−1. In this instance, an accurate UE ID of the transmission synchronization source may be transmitted through a PD2DSCH.

Figure 3:
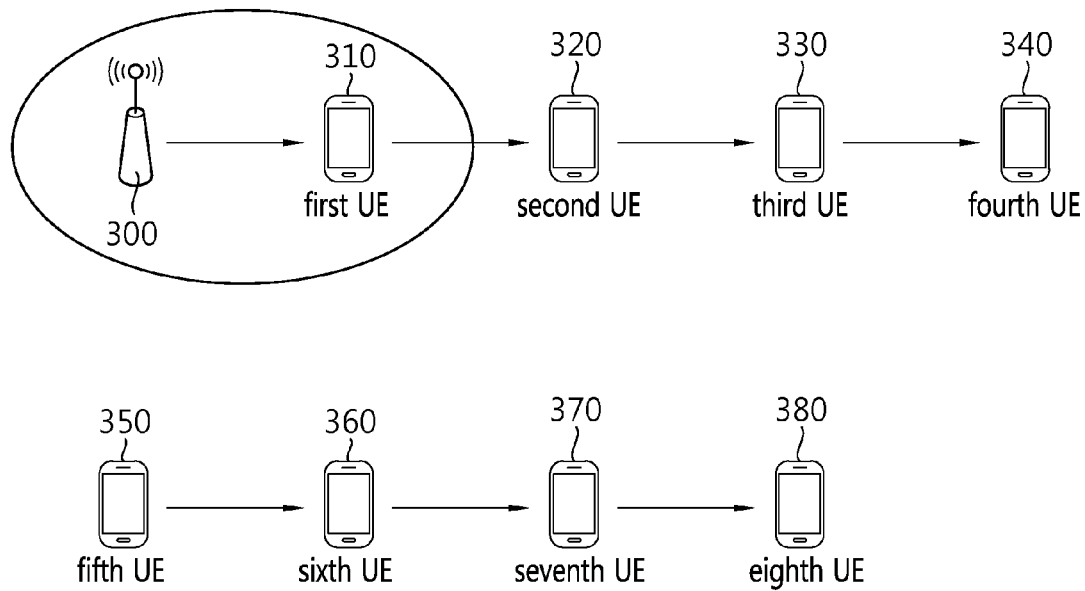
FIG. 3 is a conceptual diagram of a system to which a method of transmitting a synchronization signal is applied according to one or more exemplary embodiments.

FIG. 3 is a conceptual diagram of a system to which a method of transmitting a synchronization signal is applied according to one or more exemplary embodiments.

The upper portion of FIG. 3 illustrates synchronization signal transmissions executed from an eNodeB 300 to a first UE 310, from the first UE 310 to a second UE 320, from the second UE 320 to a third UE 330, and from the third UE 330 to a fourth UE 340, respectively. The base station 300 may be an original Synchronization Source (original SS) for the first UE 310, the second UE 320, the third UE 330, and the fourth UE 340. The base station 300 may be a transmission synchronization source (Tx SS) for the first UE 310, the first UE 310 may be a Tx SS for the second UE 320, the second UE 320 may be a Tx SS for the third UE 330, the third UE 330 may be a Tx SS for the fourth UE 340.

Referring to the lower portion of FIG. 3, a fifth UE 350 may not receive a synchronization signal from an eNodeB or another UE, but generate a synchronization signal by itself and transmit the same, and thus, the fifth UE 350 corresponds to an ISS. The fifth UE 350 may transmit a synchronization signal to a sixth UE 360, and the sixth UE 360 transmits a synchronization signal to a seventh UE 370, and the seventh UE 370 transmits a synchronization signal to an eighth UE 380. The fifth UE 350 may be an original Synchronization Source (original SS) for the sixth UE 360, the seventh UE 370, and the eighth UE 380. The fifth UE 350 may be a transmission synchronization source (Tx SS) for the sixth UE 360, the sixth UE 360 may be a Tx SS for the seventh UE 370, and the seventh UE 370 may be a Tx SS for the eighth UE 380.

Embodiments 2-1 to 2-5 describe a method of indicating D2D synchronization information when the maximum stratum level is a fourth stratum (the maximum stratum level is a third stratum when the eNodeB is excluded) in the case where an original synchronization source is an eNodeB, and when the maximum stratum level is a third stratum in the case where the original synchronization source is an ISS.

Embodiment 2-1

TABLE 10

| Case | Type of SS | | | Stratum level |
|---|---|---|---|---|
| | Tx SS | Original SS | PSSID | (hop count) |
| Case 1: eNodeB→UE₁ | eNodeB | eNodeB | PCID of eNodeB | Index 0 (or not defined) |

TABLE 10-continued

| Case | Type of SS | | | Stratum level |
| --- | --- | --- | --- | --- |
| | Tx SS | Original SS | PSSID | (hop count) |
| Case 2: eNodeB→UE$_1$→UE$_2$ | SS relaying eNodeB UE(=UE$_1$) | eNodeB | PCID of eNodeB | Index 1 |
| Case 3: eNodeB→UE$_1$→UE$_2$→UE$_3$ | SS relaying eNodeB UE(=UE$_2$) | eNodeB | PCID of eNodeB | Index 2 |
| Case 4: eNodeB→UE$_1$→UE$_2$→UE$_3$→UE$_4$ | SS relaying eNodeB UE(=UE$_3$) | eNodeB | PCID of eNodeB | Index 3 |
| Case 5: ISS(=UE$_A$)→UE$_B$ | ISS UE(=UE$_A$) | ISS(=UE$_A$) | Based on ISS(=UE$_A$) ID | Index 1 |
| Case 6: ISS(=UE$_A$)→UE$_B$→UE$_C$ | SS relaying ISS UE(=UE$_B$) | ISS(=UE$_A$) | Based on ISS(=UE$_A$) ID | Index 2 |
| Case 7: ISS(=UE$_A$)→UE$_B$→UE$_C$→UE$_D$ | SS relaying ISS UE(=UE$_C$) | ISS(=UE$_A$) | Based on ISS(=UE$_A$) ID | Index 3 |

In the present embodiment, when a type of a Synchronization Source (SS) is an eNodeB or an SS derived from an eNodeB (SS relaying eNodeB), a PCID of an eNodeB may be used as a Physical Synchronization Source Identity (PSSID), and 504 unique PSSIDs may exist.

When a type of a Synchronization Source (SS) is an ISS or an SS derived from an ISS (an SS relaying an ISS), a PSSID based on a UE ID of an ISS may be used and 504 unique PSSIDs may exist.

In the present embodiment, a type of a transmission synchronization source may be indicated by a root index value of a PD2DSS. For example, cases of Table 10 may be classified into two cases, that is, a case corresponding to Case 1 in which a transmission synchronization source is an eNodeB and the other case corresponding to Cases 2 to 7 in which a transmission synchronization source is a UE, and each case may be indicated by a root index value of a PD2DSS. A PD2DSS when the transmission synchronization source is an eNodeB, may use 25, 29, and 34, which are identical to the root indices of a PSS A PD2DSS when the transmission synchronization source is a UE may use newly defined root indices which are different from the root indices of a PSS. For example, the root indices of Table 4 may be used.

When the transmission synchronization source is a UE, a type of an original synchronization source may be indicated by a Physical D2D Synchronization Channel (PD2DSCH). For example, the cases of Table 10 may be indicated based on the classification into two cases, that is, a case corresponding to Cases 2 to 4 in which a type of an original synchronization source is an eNodeB and a case corresponding to Cases 5 to 7 in which a type of an original synchronization source is an Independent Synchronization Source (ISS). Therefore, an indication value of the PD2DSCH may have a one-bit value. When the transmission synchronization source is an eNodeB, it may be recognized that the original synchronization source is the eNodeB, through a root index value of the PD2DSS, and thus, this may not need to be indicated separately.

In addition, when the transmission synchronization source is a UE, a stratum level may be indicated by a location where a D2DSS is transmitted in a frequency-resource domain or a PD2DSCH. For example, cases 2 to 7 of Table 10 may be indicated based on the classification into three cases, that is, a case corresponding to Cases 2 and 5 in which a stratum level index is 1, another case corresponding to Cases 3 and 6 in which a stratum level index is 2, and the other case corresponding to Cases 4 and 7 in which a stratum level index is 3. Therefore, an indication value of the PD2DSCH may have a 2-bit value. When the transmission synchronization source is an eNodeB, it is recognized that the stratum level has 0 through the PD2DSS and thus, this may not need to be indicated separately.

When a type of the synchronization source is an eNodeB, a physical layer cell ID ($N_{ID}^{cell}$) corresponding to a PCID of the eNodeB may be used as a Physical Synchronization Source Identity (PSSID). The physical layer cell ID may be expressed as $N_{ID}^{cell}=3N_{ID}^{(1)}+N_{ID}^{(2)}$, and $N_{ID}^{(2)}$ may be mapped in one-to-one correspondence to root indices of the PD2DSS that may have three values, and may have an integer in a range from 0 to 2. In this instance, the root index of the PD2DSS may have one of 25, 29, and 34, which are identical to the root indices of the PSS. $N_{ID}^{(1)}$ may be mapped in one-to-one correspondence to root indices of an SD2DSS that may have 168 values, and may have an integer in a range from 0 to 167. In this instance, a value that is identical to the SSS may be used as the value of the SD2DSS.

Even when the type of the synchronization source is a synchronization source derived from an eNodeB (Cases 2, 3, and 4), a Physical Synchronization Source Identity (PSSID) may have a value identical to the PCID of the eNodeB, and 504 unique PSSIDs may exist. The PSSID) may be expressed as $N_{ID}^{D2D}=3N_{ID}^{(1)}+N_{ID}^{(2)}$, and $N_{ID}^{(2)}$ may be mapped in one-to-one correspondence to root indices of the PD2DSS that may have three values, and may have an integer in a range from 0 to 2. In this instance, newly defined root indices which are different from the root indices of the PSS may be used as a root index of the PD2DSS, and for example, the root indices of Table 4 may be used. For $N_{ID}^{(1)}$, a value of an SD2DSS that is mapped in one-to-one correspondence to an SSS having 168 sequences may be used. Therefore, the SD2DSS may have an integer in a range from 0 to 167, and a PSSID may be mapped to 504(=3*168) IDs.

When the type of the synchronization source is an ISS or a synchronization source derived from an ISS (Cases 5, 6, and 7), a Proximity based Services (ProSe) UE ID of a UE corresponding to the ISS may be used as a Physical Synchronization Source Identity (PSSID), and the PSSID may be mapped to 504 IDs based on a predetermined mapping rule. The PSSID may be expressed as $N_{ID}^{D2D}=3N_{ID}^{(1)}+N_{ID}^{(2)}$, and $N_{ID}^{(2)}$ may be mapped in one-to-one correspondence to root indices of the PD2DSS that may have three values, and may have an integer in a range from 0 to 2. In this instance, newly defined root indices which are different from the root indices of the PSS may be used as a root index of the PD2DSS, and for example, the root indices of Table 4 may be used. $N_{ID}^{(1)}$ associated with the SD2DSS may be mapped in one-to-one correspondence to an SSS having 168 sequences and may have an integer in a range from 0 to 167. Therefore, the PSSID may be mapped to 504(=3*168) IDs.

Embodiment 2-2

TABLE 11

| Case | Type of SS | | | Stratum level |
|---|---|---|---|---|
| | Tx SS | Original SS | PSSID | (hop count) |
| Case 1: eNodeB→UE$_1$ | eNodeB | eNodeB | PCID of eNodeB | Index 0 (or not defined) |
| Case 2: eNodeB→UE$_1$→UE$_2$ | SS relaying eNodeB UE(=UE$_1$) | eNodeB | Based on PCID of eNodeB | Index 1 |
| Case 3: eNodeB→UE$_1$→UE$_2$→UE$_3$ | SS relaying eNodeB UE(=UE$_2$) | eNodeB | Based on PCID of eNodeB | Index 2 |
| Case 4: eNodeB→UE$_1$→UE$_2$→UE$_3$→UE$_4$ | SS relaying eNodeB UE(=UE$_3$) | eNodeB | Based on PCID of eNodeB | Index 3 |
| Case 5: ISS(=UE$_A$)→UE$_B$ | ISS UE(=UE$_A$) | ISS(=UE$_A$) | Based on ISS(=UE$_A$) ID | Index 1 |
| Case 6: ISS(=UE$_A$)→UE$_B$→UE$_C$ | SS relaying ISS UE(=UE$_B$) | ISS(=UE$_A$) | Based on ISS(=UE$_A$) ID | Index 2 |
| Case 7: ISS(=UE$_A$)→UE$_B$→UE$_C$→UE$_D$ | SS relaying ISS UE(=UE$_C$) | ISS(=UE$_A$) | Based on ISS(=UE$_A$) ID | Index 3 |

In the present embodiment, when a type of a Synchronization Source (SS) is an eNodeB, a PCID of the eNodeB may be used as a PSSID, and 504 unique PSSIDs may be used. When the type of the synchronization source is an Synchronization Source (SS) derived from an eNodeB (SS relaying an eNodeB), a value modified based on the PCID of the eNodeB may be used as a PSSID, and 168 or K unique PSSIDs may exist, wherein K is a value that is less than 168.

When the type of the Synchronization Source (SS) is an ISS or an SS derived from an ISS (an SS relaying an ISS), a PSSID may be determined based on a UE ID of the ISS, and 168 or K unique PSSIDs may exist, wherein K is a value that is less than 168.

In the present embodiment, a type of a transmission synchronization source may be indicated by a root index value of a PD2DSS. For example, cases of Table 11 may be classified into two cases, that is, a case corresponding to Case 1 in which a transmission synchronization source is an eNodeB and the other case corresponding to Cases 2 to 7 in which a transmission synchronization source is a UE, and each case may be indicated by a root index value of a PD2DSS. A PD2DSS when the transmission synchronization source is an eNodeB, may use 25, 29, and 34, which are identical to the root indices of a PSS A PD2DSS when the transmission synchronization source is a UE may use newly defined root indices which are different from the root indices of a PSS. For example, the root indices of Table 4 may be used.

When the transmission synchronization source is a UE, a type of an original synchronization source may be indicated by a Physical D2D Synchronization Channel (PD2DSCH). For example, the cases of Table 11 may be indicated based on the classification into two cases, that is, a case corresponding to Cases 2 to 4 in which a type of an original synchronization source is an eNodeB and the other case corresponding to Cases 5 to 7 in which a type of an original synchronization source is an Independent Synchronization Source (ISS). Therefore, an indication value of the PD2DSCH may have a one-bit value. When the transmission synchronization source is an eNodeB, it may be recognized that the original synchronization source is the eNodeB, through a root index value of the PD2DSS, and thus, this may not need to be indicated separately.

When the transmission synchronization source is a UE, a stratum level may be indicated by a root index of a PD2DSS. For example, cases of Table 11 may be indicated based on the classification into three cases, that is, a case corresponding to Cases 2 and 5 in which a stratum level index is 1, another case corresponding to Cases 3 and 6 in which a stratum level index is 2, and the other case corresponding to Cases 4 and 7 in which a stratum level index is 3. Therefore, when three newly defined root indices of a PD2DSS are X, Y, and Z, respectively, for example, a root index X may be set to indicate a stratum level 1, a root index Y may be set to indicate a stratum level 2, and a root index Z may be set to indicate a stratum level 3. The root indices of Table 4 may be used as the newly defined root indices of the PD2DSS.

When the type of the synchronization source is an eNodeB (Case 1), a physical layer cell ID ($N_{ID}^{cell}$) corresponding to a PCID of the eNodeB may be used as a Physical Synchronization Source Identity (PSSID). The physical layer cell ID may be expressed as $N_{ID}^{cell}=3N_{ID}^{(1)}+N_{ID}^{(2)}$, and $N_{ID}^{cell}$ may be mapped in one-to-one correspondence to root indices of the PD2DSS that may have three values, and may have an integer in a range from 0 to 2. In this instance, the root index of the PD2DSS may have one of 25, 29, and 34, which are identical to the root indices of the PSS. $N_{ID}^{(1)}$ may be mapped in one-to-one correspondence to root indices of an SD2DSS that may have 168 values, and may have an integer in a range from 0 to 167. In this instance, a value that is identical to the SSS may be used as the value of the SD2DSS.

When the type of the synchronization source is a synchronization source derived from an eNodeB (an SS relaying an eNodeB) (Cases 2, 3, and 4), a Physical Synchronization Source Identity (PSSID) may be mapped to 168 or K IDs based on a PCID of the eNodeB using a predetermined rule, wherein K is a value that is less than 168. Therefore, the PSSID may have a value in a range from 0 to 167 or in a range from 0 to K−1. The PSSID may be expressed as $N_{ID}^{D2D}=N_{ID}^{(1)}$, and $N_{ID}^{(1)}$ associated with the SD2DSS may be mapped in one-to-one correspondence to an SSS that may have 168 values, and may have an integer in a range from 0 to 167, or may be mapped in one-to-one correspondence to K values, based on sequences that are modified or partially selected from an SSS having 168 sequences and may have an integer in a range from 0 to K−1, wherein K is a value less than 168. In this instance, an accurate PCID of the eNodeB may be transmitted through a PD2DSCH.

When the type of the synchronization source is an ISS or a synchronization source derived from an ISS (an SS relaying an ISS) (Cases 5, 6, and 7), a Proximity based Services (ProSe) UE ID of a UE corresponding to the ISS may be used as a Physical Synchronization Source Identity (PSSID), and the PSSID may be mapped to 168 or K IDs based on a predetermined mapping rule, wherein K is a value that is less than 168. Therefore, the PSSID may have a value in a range from 0 to 167 or in a range from 0 to K−1. The PSSID may be expressed as $N_{ID}^{D2D} = N_{ID}^{(1)}$, and $N_{ID}^{(1)}$ associated with the SD2DSS may be mapped in one-to-one correspondence to an SSS that may have 168 values, and may have an integer in a range from 0 to 167, or may be mapped in one-to-one correspondence to K values, based on sequences that are modified or partially selected from an SSS having 168 sequences and may have an integer in a range from 0 to K−1, wherein K is a value less than 168. Therefore, the PSSID may have a value in a range from 0 to 167 or in a range from 0 to K−1. In this instance, an accurate PCID of the ISS may be transmitted through a PD2DSCH.

Embodiment 2-3

TABLE 12

| Case | Type of SS | | | Stratum level |
| | Tx SS | Original SS | PSSID | (hop count) |
| --- | --- | --- | --- | --- |
| Case 1: eNodeB→UE$_1$ | eNodeB eNodeB | eNodeB | PCID of eNodeB | Index 0 (or not defined) |
| Case 2: eNodeB→UE$_1$→UE$_2$ | SS relaying eNodeB UE(=UE$_1$) | eNodeB | PCID of eNodeB | Index 1 |
| Case 3: eNodeB→UE$_1$→UE$_2$→UE$_3$ | SS relaying eNodeB UE(=UE$_2$) | eNodeB | PCID of eNodeB | Index 2 |
| Case 4: eNodeB→UE$_1$→UE$_2$→UE$_3$→UE$_4$ | SS relaying eNodeB UE(=UE$_3$) | eNodeB | PCID of eNodeB | Index 3 |
| Case 5: ISS(=UE$_A$)→UE$_B$ | ISS UE(=UE$_A$) | ISS(=UE$_A$) | Based on ISS(=UE$_A$) ID | Index 1 |
| Case 6: ISS(=UE$_A$)→UE$_B$→UE$_C$ | SS relaying ISS UE(=UE$_B$) | ISS(=UE$_A$) | Based on ISS(=UE$_A$) ID | Index 2 |
| Case 7: ISS(=UE$_A$)→UE$_B$→UE$_C$→UE$_D$ | SS relaying ISS UE(=UE$_C$) | ISS(=UE$_A$) | Based on ISS(=UE$_A$) ID | Index 3 |

In the present embodiment, when a type of a Synchronization Source (SS) is an eNodeB or an SS derived from an eNodeB (an SS relaying an eNodeB), a PCID of the eNodeB may be used as a PSSID, and 504 unique PSSIDs may be used.

When the type of the Synchronization Source (SS) is an ISS or an SS derived from an ISS (an SS relaying an ISS), a PSSID may be determined based on an ISS ID, and 168 or K unique PSSIDs may exist, wherein K is a value that is less than 168.

In the present embodiment, a type of a transmission synchronization source may be indicated by a root index value of a PD2DSS. For example, cases of Table 12 may be classified into two cases, that is, a case corresponding to Case 1 in which a transmission synchronization source is an eNodeB and the other case corresponding to Cases 2 to 7 in which a transmission synchronization source is a UE, and each case may be indicated by a root index value of a PD2DSS. A PD2DSS when the transmission synchronization source is an eNodeB, may use 25, 29, and 34, which are identical to the root indices of a PSS A PD2DSS when the transmission synchronization source is a UE may use newly defined root indices which are different from the root indices of a PSS. For example, the root indices of Table 4 may be used.

When the transmission synchronization source is a UE, a type of an original synchronization source may be indicated by a Physical D2D Synchronization Channel (PD2DSCH). For example, the cases of Table 12 may be indicated based on the classification into two cases, that is, a case corresponding to Cases 2 to 4 in which a type of an original synchronization source is an eNodeB and the other case corresponding to Cases 5 to 7 in which a type of an original synchronization source is an Independent Synchronization Source (ISS). Therefore, an indication value of the PD2DSCH may have a one-bit value. When the transmission synchronization source is an eNodeB, it may be recognized that the original synchronization source is the eNodeB, through a root index value of the PD2DSS, and thus, this may not need to be indicated separately.

In addition, when the original synchronization source is an eNodeB and the transmission synchronization source is a UE, a stratum level may be indicated by a location where a D2DSS is transmitted in a frequency-resource domain or a PD2DSCH. For example, the cases of Table 12 may be indicated based on the classification into three cases, that is, a case corresponding to Case 2 in which a stratum level is 1, another case corresponding to Case 3 in which a stratum level is 2, and the other case corresponding to Case 4 in which a stratum level is 3. Therefore, an indication value of the PD2DSCH may have a 2-bit value. Here, 2-bit information of the PD2DSCH may be designed to be different based on a coverage scenario, and the 2-bit information of the PD2DSCH may be designed to not be included in an out-of-coverage. Therefore, in Cases 5 and 6 in which the original synchronization source is an ISS, a stratum level may be indicated by a root index value of a PD2DSS, as opposed to by a PD2DSH. When the transmission synchronization source is an eNodeB, a stratum level may be recognized through a root index value of the PD2DSS, and thus, this may not need to be indicated separately.

When the original synchronization source is an ISS, a stratum level may be indicated by a root index of a PD2DSS. Cases 5 and 6 of Table 12 may be classified into a total of three cases, based on a stratum level. Therefore, when three newly defined root indices of a PD2DSS are X, Y, and Z, respectively, for example, a root index X may be set to indicate a stratum level 1, a root index Y may be set to indicate a stratum level 2, and a root index Z may be set to indicate a stratum level 3. The root indices of Table 4 may be used as the newly defined root indices of the PD2DSS.

When the type of the synchronization source is an eNodeB (Case 1), a physical layer cell ID ($N_{ID}^{cell}$) corresponding to a PCID of the eNodeB may be used as a Physical Synchronization Source Identity (PSSID). The physical layer cell ID may be expressed as $N_{ID}^{cell}=3N_{ID}^{(1)}+N_{ID}^{(2)}$, and $N_{ID}^{(2)}$ may be mapped in one-to-one correspondence to root indices of the PD2SS that may have three values, and may have an integer in a range from 0 to 2. In this instance, the root index of the PD2DSS may have one of 25, 29, and 34, which are identical to the root indices of the PSS. $N_{ID}^{(1)}$ may be mapped in one-to-one correspondence to root indices of an SD2DSS that may have 168 values, and may have an integer in a range from 0 to 167. In this instance, a value that is identical to the SSS may be used as the value of the SD2DSS.

Even when the type of the synchronization source is a synchronization source derived from an eNodeB (Cases 2, 3, and 4), a Physical Synchronization Source Identity (PSSID) may have a value identical to the PCID of the eNodeB, and 504 unique PSSIDs may exist. The PSSID may be expressed as $N_{ID}^{D2D}=3N_{ID}^{(1)}+N_{ID}^{(2)}$, and $N_{ID}^{(2)}$ may be mapped in one-to-one correspondence to root indices of the PD2DSS that may have three values, and may have an integer in a range from 0 to 2. In this instance, newly defined root indices which are different from the root indices of the PSS may be used as a root index of the PD2DSS, and for example, the root indices of Table 4 may be used. For $N_{ID}^{(1)}$, a value of an SD2DSS that is mapped in one-to-one correspondence to an SSS having 168 sequences may be used. Therefore, the SD2DSS may have an integer in a range from 0 to 167, and a PSSID may be mapped to 504(=3*168) IDs.

When the type of the synchronization source is an ISS or a synchronization source derived from an ISS (SS relaying an ISS) (Cases 5, 6, and 7), a Proximity based Services (ProSe) UE ID of a UE corresponding to the ISS may be used as a Physical Synchronization Source Identity (PSSID), and the PSSID may be mapped to 168 or K IDs based on a predetermined mapping rule, wherein K is a value that is less than 168. Therefore, the PSSID may have a value in a range from 0 to 167 or in a range from 0 to K−1. The PSSID may be expressed as $N_{ID}^{D2D}=N_{ID}^{(1)}$, and $N_{ID}^{(1)}$ associated with the SD2DSS may be mapped in one-to-one correspondence to an SSS that may have 168 values, and may have an integer in a range from 0 to 167, or may be mapped in one-to-one correspondence to K values, based on sequences that are modified or partially selected from an SSS having 168 sequences and may have an integer in a range from 0 to K−1, wherein K is a value less than 168. In this instance, an accurate UE ID of the ISS may be transmitted through a PD2DSCH.

Embodiment 2-4

TABLE 13

| | Type of SS | | | Stratum level |
|---|---|---|---|---|
| Case | Tx SS | Original SS | PSSID | (hop count) |
| Case 1: eNodeB→UE$_1$ | eNodeB | eNodeB | PCID of eNodeB | Index 0 (or not defined) |
| Case 2: eNodeB→UE$_1$→UE$_2$ | SS relaying eNodeB UE(=UE$_1$) | eNodeB | Based on UE(=UE$_1$) ID | Index 1 |
| Case 3: eNodeB→UE$_1$→UE$_2$→UE$_3$ | SS relaying eNodeB UE(=UE$_2$) | eNodeB | Based on UE(=UE$_2$) ID | Index 2 |
| Case 4: eNodeB→UE$_1$→UE$_2$→UE$_3$→UE$_4$ | SS relaying eNodeB UE(=UE$_3$) | eNodeB | Based on UE(=UE$_3$) ID | Index 3 |
| Case 5: ISS(=UE$_A$)→UE$_B$ | ISS UE(=UE$_A$) | ISS(=UE$_A$) | Based on UE(=UE$_A$) ID | Index 1 |
| Case 6: ISS(=UE$_A$)→UE$_B$→UE$_C$ | SS relaying ISS UE(=UE$_B$) | ISS(=UE$_A$) | Based on UE(=UE$_B$) ID | Index 2 |
| Case 7: ISS(=UE$_A$)→UE$_B$→UE$_C$→UE$_D$ | SS relaying ISS UE(=UE$_C$) | ISS(=UE$_A$) | Based on UE(=UE$_C$) ID | Index 3 |

In the present embodiment, when a type of a Synchronization Source (SS) is an eNodeB, a PCID of the eNodeB may be used as a PSSID, and 504 unique PSSIDs may be used.

When the type of the Synchronization Source (SS) is an SS derived from an eNodeB (an SS relaying an eNodeB), an ISS, or an SS derived from an ISS (an SS relaying an ISS), a PSSID may be determined based on a UE ID of a transmission synchronization source, and 504 unique PSSIDs may exist.

In the present embodiment, a type of a transmission synchronization source may be indicated by a root index value of a PD2DSS. For example, cases of Table 13 may be classified into two cases, that is, a case corresponding to Case 1 in which a transmission synchronization source is an eNodeB and the other case corresponding to Cases 2 to 7 in which a transmission synchronization source is a UE, and each case may be indicated by a root index value of a PD2DSS. A PD2DSS when the transmission synchronization source is an eNodeB, may use 25, 29, and 34, which are identical to the root indices of a PSS A PD2DSS when the transmission synchronization source is a UE may use newly defined root indices which are different from the root indices of a PSS. For example, the root indices of Table 4 may be used.

When the transmission synchronization source is a UE, a type of an original synchronization source may be indicated by a Physical D2D Synchronization Channel (PD2DSCH). For example, the cases of Table 13 may be indicated based on the classification into two cases, that is, a case corresponding to Cases 2 to 4 in which a type of an original synchronization source is an eNodeB and a case corresponding to Cases 5 to 7 in which a type of an original synchronization source is an Independent Synchronization Source (ISS). Therefore, an indication value of the PD2DSCH may have a one-bit value. When the transmission synchronization source is an eNodeB, it may be recognized that the original synchronization source is the eNodeB, through a root index value of the PD2DSS, and thus, this may not need to be indicated separately.

In addition, when the transmission synchronization source is a UE, a stratum level may be indicated by a location where a D2DSS is transmitted in a frequency-resource domain or a PD2DSCH. For example, the cases of Table 13 may be indicated based on the classification into three cases, that is, a case corresponding to Cases 2 and 5 in which a stratum level index is 1, another case corresponding to Cases 3 and 6 in which a stratum level index is 2, and the other case corresponding to Cases 4 and 7 in which a stratum level index is 3. Therefore, an indication value of the PD2DSCH may have a 2-bit value.

When the type of the synchronization source is an eNodeB (Case 1), a physical layer cell ID ($N_{ID}^{cell}$) corresponding to a PCID of the eNodeB may be used as a Physical Synchronization Source Identity (PSSID). The physical layer cell ID may be expressed as $N_{ID}^{cell} = 3N_{ID}^{(1)} + N_{ID}^{(2)}$, and $N_{ID}^{(2)}$ may be mapped in one-to-one correspondence to root indices of the PD2DSS that may have three values, and may have an integer in a range from 0 to 2. In this instance, the root index of the PD2DSS may have one of 25, 29, and 34, which are identical to the root indices of the PSS. $N_{ID}^{(1)}$ may be mapped in one-to-one correspondence to root indices of an SD2DSS that may have 168 values, and may have an integer in a range from 0 to 167. In this instance, a value that is identical to the SSS may be used as the value of the SD2DSS.

When the type of the synchronization source is a synchronization source derived from an eNodeB (an SS relaying an eNodeB), an ISS, or a synchronization source derived from an ISS (an SS relaying an ISS) (Cases 2, 3, 4, 5, 6, and 7), a Proximity based Services (ProSe) UE ID of a transmission (Tx) UE may be used as a Physical Synchronization Source Identity (PSSID), and the PSSID may be mapped to 504 IDs based on a predetermined mapping rule. The PSSID may be expressed as $N_{ID}^{D2D} = 3N_{ID}^{(1)} + N_{ID}^{(2)}$, and, $N_{ID}^{(2)}$ may be mapped in one-to-one correspondence to root indices of the PD2DSS that may have three values, and may have an integer in a range from 0 to 2. In this instance, newly defined root indices which are different from the root indices of the PSS may be used as a root index of the PD2DSS, and for example, the root indices of Table 4 may be used. $N_{ID}^{(1)}$ associated with the SD2DSS may be mapped in one-to-one correspondence to an SSS having 168 sequences and may have an integer in a range from 0 to 167. Therefore, the PSSID may be mapped to 504(=3*168) IDs.

Embodiment 2-5

In the present embodiment, when a type of a Synchronization Source (SS) is an eNodeB, a PCID of the eNodeB may be used as a Physical Synchronization Source Identity (PSSID), and 504 unique PSSIDs may exist.

When the type of the Synchronization Source (SS) is an SS derived from an eNodeB (an SS relaying an eNodeB), an ISS, or an SS derived from an ISS (an SS relaying an ISS), a PSSID based on a UE ID of a transmission synchronization source may be used as a PSSID, and 168 or K unique PSSIDs may exist, wherein K is a value less than 168.

In the present embodiment, a type of a transmission synchronization source may be indicated by a root index value of a PD2DSS. For example, the cases of Table 14 may be classified into two cases, that is, a case corresponding to Case 1 in which a transmission synchronization source is an eNodeB and the other case corresponding to Cases 2 to 7 in which a transmission synchronization source is a UE, and each case may be indicated by a root index value of a PD2DSS. A PD2DSS when the transmission synchronization source is an eNodeB, may use 25, 29, and 34, which are identical to the root indices of a PSS A PD2DSS when the transmission synchronization source is a UE may use newly defined root indices which are different from the root indices of a PSS. For example, the root indices of Table 4 may be used.

When the transmission synchronization source is a UE, a type of an original synchronization source may be indicated by a Physical D2D Synchronization Channel (PD2DSCH). For example, the cases of Table 14 may be indicated based on the classification into two cases, that is, a case corresponding to Cases 2 to 4 in which a type of an original synchronization source is an eNodeB and the other case corresponding to Cases 5 to 7 in which a type of an original synchronization source is an Independent Synchronization Source (ISS). Therefore, an indication value of the PD2DSCH may have a one-bit value. When the transmission synchronization source is an eNodeB, it may be recognized that the original synchronization source is the eNodeB, through a root index value of the PD2DSS, and thus, this may not need to be indicated separately.

When the transmission synchronization source is an eNodeB, a stratum level only has an index value of 0. Also, the stratum level may be indicated by any one of 25, 29, and 34, which are root indices of the PD2DSS.

When the transmission synchronization source is a UE, a stratum level may be indicated by a root index of a PD2DSS. For example, the cases of Table 14 may be indicated based

TABLE 14

| | Type of SS | | | Stratum level |
|---|---|---|---|---|
| Case | Tx SS | Oritinal SS | PSSID | (hop count) |
| Case 1: eNodeB→$UE_1$ | eNodeB eNodeB | | PCID of eNodeB | Index 0 (or not defined) |
| Case 2: eNodeB→$UE_1$→$UE_2$ | SS relaying eNodeB UE(=$UE_1$) | eNodeB | Based on UE(=$UE_1$) ID | Index 1 |
| Case 3: eNodeB→$UE_1$→$UE_2$→$UE_3$ | SS relaying eNodeB UE(=$UE_2$) | eNodeB | Based on UE(=$UE_2$) ID | Index 2 |
| Case 4: eNodeB→$UE_1$→$UE_2$→$UE_3$→$UE_4$ | SS relaying eNodeB UE(=$UE_3$) | eNodeB | Based on UE(=$UE_3$) ID | Index 3 |
| Case 5: ISS(=$UE_A$)→$UE_B$ | ISS UE(=$UE_A$) | ISS(=$UE_A$) | Based on UE(=$UE_A$) ID | Index 1 |
| Case 6: ISS(=$UE_A$)→$UE_B$→$UE_C$ | SS relaying ISS UE(=$UE_B$) | ISS(=$UE_A$) | Based on UE(=$UE_B$) ID | Index 2 |
| Case 7: ISS(=$UE_A$)→$UE_B$→$UE_C$→$UE_D$ | SS relaying ISS UE(=$UE_C$) | ISS(=$UE_A$) | Based on UE(=$UE_C$) ID | Index 3 | on the classification into three cases, that is, a case corresponding to Cases 2 and 5 in which a stratum level index is 1, another case corresponding to Cases 3 and 6 in which a stratum level index is 2, and the other case corresponding to Cases 4 and 7 in which a stratum level index is 3. Therefore, when three newly defined root indices of a PD2DSS are X, Y, and Z, respectively, for example, a root index X may be set to indicate a stratum level 1, a root index Y may be set to indicate a stratum level 2, and a root index Z may be set to indicate a stratum level 3. The root indices of Table 4 may be used as the newly defined root indices of the PD2DSS.

When the type of the synchronization source is an eNodeB, a physical layer cell ID ($N_{ID}^{cell}$) corresponding to a PCID of the eNodeB may be used as a Physical Synchronization Source Identity (PSSID). The physical layer cell ID may be expressed as $N_{ID}^{cell}=3N_{ID}^{(1)}+N_{ID}^{(2)}$, and $N_{ID}^{(2)}$ be mapped in one-to-one correspondence to root indices of the PD2DSS that may have three values, and may have an integer in a range from 0 to 2. In this instance, the root index of the PD2DSS may have one of 25, 29, and 34, which are identical to the root indices of the PSS. $N_{ID}^{(1)}$ may be mapped in one-to-one correspondence to root indices of an SD2DSS that may have 168 values, and may have an integer in a range from 0 to 167. In this instance, a value that is identical to the SSS may be used as the value of the SD2DSS.

When the type of the synchronization source is a synchronization source derived from an eNodeB (an SS relaying an eNodeB), an ISS, or a synchronization source derived from an ISS (an SS relaying an ISS), a Proximity based Services (ProSe) UE ID of a transmission (Tx) UE may be used as a Physical Synchronization Source Identity (PSSID), and the PSSID may be mapped to 168 or K IDs based on a predetermined mapping rule, wherein K is a value less than 168. Therefore, the PSSID may have a value in a range from 0 to 167 or in a range from 0 to K−1. The PSSID may be expressed by $N_{ID}^{D2D}=N_{ID}^{(1)}$, and $N_{ID}^{(1)}$ associated with the SD2DSS may be mapped in one-to-one correspondences to an SSS having 168 sequences, or may be mapped to K sequences based on sequences modified or partially selected from the SSS having 168 sequences, wherein K is a value less than 168. When $N_{ID}^{(1)}$ is mapped in one-to-one correspondence to 168 sequences, it may have an integer in a range from 0 to 167, and when it is mapped in one-to-one correspondence to K sequences, it may have an integer in a range from 0 to K−1. In this instance, an accurate UE ID of the transmission synchronization source may be transmitted through a PD2DSCH.

Figure 4:
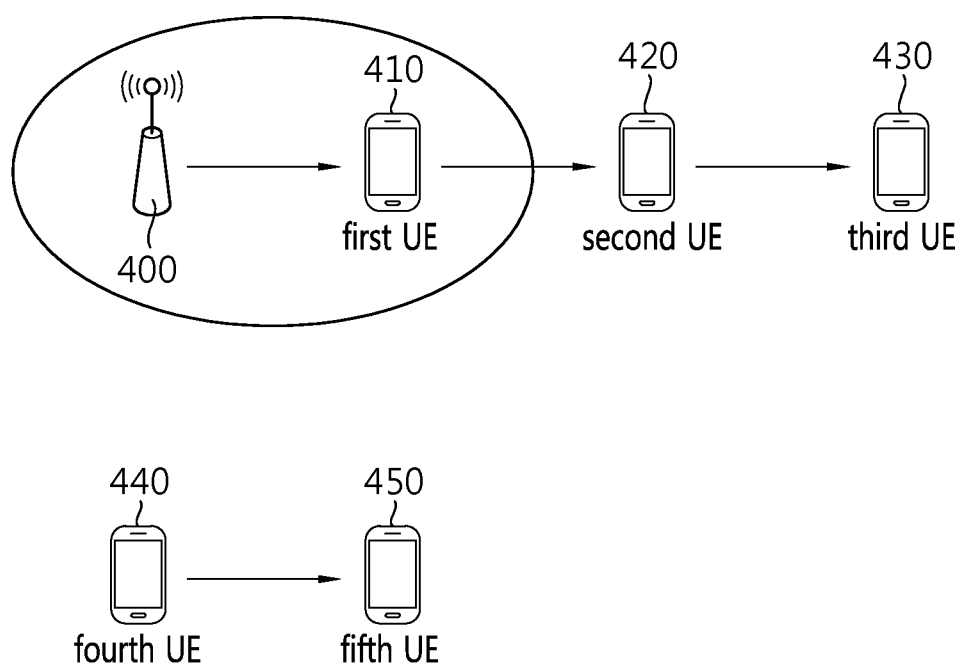
FIG. 4 is a conceptual diagram of a system to which a method of transmitting a synchronization signal is applied according to one or more exemplary embodiments.

FIG. 4 is a conceptual diagram of a system to which a method of transmitting a synchronization signal is applied according to one or more exemplary embodiments.

The upper portion of FIG. 4 illustrates synchronization signal transmissions executed from an eNodeB 400 to a first UE 410, from the first UE 410 to a second UE 420, and from the second UE 420 to a third UE 430, respectively. The eNodeB 400 may be an original Synchronization Source (original SS) for the first UE 410, the second UE 420, and the third UE 430. The eNodeB 400 may be a transmission synchronization source (Tx SS) for the first UE 410, the first UE 410 may be a Tx SS for the second UE 420, and the second UE 420 may be a Tx SS for the third UE 430.

Referring to the lower portion of FIG. 4, a fourth UE 440 may not receive a synchronization signal from an eNodeB or another UE, but generate a synchronization signal by itself and transmit the same, and thus, the fourth UE 440 corresponds to an ISS. The fourth UE 440 may transmit a direct synchronization signal to the fifth UE 450. Therefore, the fourth UE 440 may be both an original synchronization source (original SS) and a transmission synchronization source (Tx SS), with respect to the fifth UE 450. In FIG. 4, UEs may exist between the fourth UE 440 and the fifth UE 450, the fourth UE 440 transmits a direct synchronization signal to one of the UEs, and a UE that takes the fourth UE 440 as an original synchronization source from among the UEs may transmit a direct synchronization signal to the fifth UE 450. Even in this instance, that is, even though the synchronization of the fourth UE 440, which is the original synchronization source, is transmitted to the fifth UE 450 via a few UEs, the fifth UE 450 assumes a first stratum level as a stratum level. In other words, when the original synchronization source is an ISS, a stratum level is assumed to be an identical value or may not be defined.

Embodiments 3-1 to 3-5 describe a method of indicating D2D synchronization information when the maximum stratum level is a third stratum (the maximum stratum level is a second stratum when the eNodeB is excluded) in the case where an original synchronization source is an eNodeB, and when the maximum stratum level is a first stratum (or not defined) in the case where the original synchronization source is an ISS.

Embodiment 3-1

TABLE 15

| | Type of SS | | | Stratum level |
|---|---|---|---|---|
| Case | Tx SS | Original SS | PSSID | (hop count) |
| Case 1: eNodeB→$UE_1$ | eNodeB | eNodeB | PCID of eNodeB | $1^{st}$ (Index 0 (or 1)) |
| Case 2: eNodeB→$UE_1$→$UE_2$ | SS relaying eNodeB UE(=$UE_1$) | eNodeB | PCID of eNodeB | $2^{nd}$ (Index 1 (or 2)) |
| Case 3: eNodeB→$UE_1$→$UE_2$→$UE_3$ | SS relaying eNodeB UE(=$UE_2$) | eNodeB | PCID of eNodeB | $3^{rd}$ (Index 2 (or 3)) |
| Case 4: ISS(=$UE_A$)→ . . . →$UE_B$ | ISS or SS relaying ISS UE(e.g. $UE_A$) | ISS(=$UE_A$) | Based on ISS(=$UE_A$) ID | $1^{st}$ (Index 0 (or 1))(or not defined) |

In the present embodiment, when a type of a Synchronization Source (SS) is an eNodeB or an SS derived from an eNodeB (SS relaying eNodeB), a PCID of an eNodeB may be used as a Physical Synchronization Source Identity (PSSID), and 504 unique PSSIDs may exist.

When a type of a Synchronization Source (SS) is an ISS or an SS derived from an ISS (an SS relaying an ISS), a PSSID based on a UE ID of an ISS may be used as a PSSID, and 504 unique PSSIDs may exist.

In the present embodiment, a type of a transmission synchronization source may be indicated by a root index value of a PD2DSS. For example, the cases of Table 15 may be classified into two cases, that is, a case corresponding to Case 1 in which a transmission synchronization source is an eNodeB and the other case corresponding to Cases 2 to 4 in which a transmission synchronization source is a UE, and each case may be indicated by a root index value of a PD2DSS. A PD2DSS when the transmission synchronization source is an eNodeB, may use 25, 29, and 34, which are identical to the root indices of a PSS A PD2DSS when the transmission synchronization source is a UE, may use newly defined root indices which are different from the root indices of a PSS. For example, the root indices of Table 4 may be used.

When the transmission synchronization source is a UE, a type of an original synchronization source may be indicated by a Physical D2D Synchronization Channel (PD2DSCH). For example, the cases of Table 15 may be indicated based on the classification into two cases, that is, a case corresponding to Cases 2 and 3 in which a type of an original synchronization source is an eNodeB and the other case corresponding to Case 4 in which a type of an original synchronization source is an Independent Synchronization Source (ISS). Therefore, an indication value of the PD2DSCH may have a one-bit value. When the transmission synchronization source is an eNodeB, it may be recognized that the original synchronization source is the eNodeB, through a root index value of the PD2DSS, and thus, this may not need to be indicated separately.

In addition, when the transmission synchronization source is a UE and the original synchronization source is an eNodeB, a stratum level may be indicated by a location where a D2DSS is transmitted in a frequency-resource domain or a PD2DSCH. For example, Cases 2 and 3 corresponding to the condition from Table 15 may be indicated based on the classification into two cases, that is, Case 2 in which a stratum level is a second stratum and Case 3 in which a stratum level is a third stratum. Therefore, an indication value of the PD2DSCH may have a 1-bit value. The stratum level when the transmission synchronization source is an eNodeB is as many as 1 event and thus, this may be recognized through information associated with a type of a transmission synchronization source.

Also, the case in which the transmission synchronization source is an ISS corresponds to Case 4, which is as many as 1 event, and this may be recognized through information associated with an original synchronization source, and thus, may not need to be indicated separately.

When the type of the synchronization source is an eNodeB, a physical layer cell ID ($N_{ID}^{cell}$) corresponding to a PCID of the eNodeB may be used as a Physical Synchronization Source Identity (PSSID). The physical layer cell ID may be expressed as $N_{ID}^{cell}=3N_{ID}^{(1)}+N_{ID}^{(2)}$, and $N_{ID}^{(2)}$ may be mapped in one-to-one correspondence to root indices of the PD2DSS that may have three values, and may have an integer in a range from 0 to 2. In this instance, the root index of the PD2DSS may have one of 25, 29, and 34, which are identical to the root indices of the PSS. $N_{ID}^{(1)}$ may be mapped in one-to-one correspondence to root indices of an SD2DSS that may have 168 values, and may have an integer in a range from 0 to 167. In this instance, a value that is identical to the SSS may be used as the value of the SD2DSS.

Even when the type of the synchronization source is a synchronization source derived from an eNodeB, a Physical Synchronization Source Identity (PSSID) may have a value identical to the PCID of the eNodeB, and 504 unique PSSIDs may exist. The PSSID may be expressed as $N_{ID}^{D2D}=3N_{ID}^{(1)}+N_{ID}^{(2)}$, and $N_{ID}^{(2)}$ may be mapped in one-to-one correspondence to root indices of the PD2DSS that may have three values, and may have an integer in a range from 0 to 2. In this instance, newly defined root indices which are different from the root indices of the PSS may be used as a root index of the PD2DSS, and for example, the root indices of Table 4 may be used. For $N_{ID}^{(1)}$, a value of an SD2DSS that is mapped in one-to-one correspondence to an SSS having 168 sequences may be used. Therefore, the SD2DSS may have an integer in a range from 0 to 167, and a PSSID may be mapped to 504(=3*168) IDs.

When the type of the synchronization source is an ISS or a synchronization source derived from an ISS, a Proximity based Services (ProSe) UE ID of a UE corresponding to the ISS may be used as a Physical Synchronization Source Identity (PSSID), and the PSSID may be mapped to 504 IDs based on a predetermined mapping rule. The PSSID may be expressed as $N_{ID}^{D2D}=3N_{ID}^{(1)}+N_{ID}^{(2)}$, and $N_{ID}^{(2)}$ may be mapped in one-to-one correspondence to root indices of the PD2DSS that may have three values, and may have an integer in a range from 0 to 2. For example, the root indices of Table 4 may be used. For $N_{ID}^{(1)}$, a value of an SD2DSS that is mapped in one-to-one correspondence to an SSS having 168 sequences may be used. $N_{ID}^{(1)}$ associated with the SD2DSS may be mapped in one-to-one correspondence to an SSS having 168 sequences and may have an integer in a range from 0 to 167. Therefore, the PSSID may be mapped to 504(=3*168) IDs.

Embodiment 3-2

TABLE 16

| | Type of SS | | | Stratum level |
|---|---|---|---|---|
| Case | Tx SS | Original SS | PSSID | (hop count) |
| Case 1: eNodeB→UE$_1$ | eNodeB | eNodeB | PCID of eNodeB | 1$^{st}$ (Index 0 (or 1)) |
| Case 2: eNodeB→UE$_1$→UE$_2$ | SS relaying eNodeB UE(=UE$_1$) | eNodeB | PCID of eNodeB | 2$^{nd}$ (Index 1 (or 2)) |
| Case 3: eNodeB→UE$_1$→UE$_2$→UE$_3$ | SS relaying eNodeB UE(=UE$_2$) | eNodeB | PCID of eNodeB | 3$^{rd}$ (Index 2 (or 3)) |
| Case 4: ISS(=UE$_A$)→ . . . →UE$_B$ | ISS or SS relaying ISS UE(e.g. UE$_A$) | ISS(=UE$_A$) | Based on ISS(=UE$_A$) ID | 1$^{st}$ (Index 0 (or 1))(or not defined) |

In the present embodiment, when a type of a Synchronization Source (SS) is an eNodeB, a PCID of the eNodeB may be used as a PSSID, and 504 unique PSSIDs may be used. When the type of the synchronization source is a Synchronization Source (SS) derived from an eNodeB (SS relaying an eNodeB), a value modified based on the PCID of the eNodeB may be used as a PSSID, and 168 or K unique PSSIDs may exist, wherein K is a value that is less than 168.

When the type of the Synchronization Source (SS) is an ISS or an SS derived from an ISS (an SS relaying an ISS), a PSSID may be determined based on a UE ID of the ISS, and 168 or K unique PSSIDs may exist, wherein K is a value that is less than 168.

In the present embodiment, a transmission synchronization source is indicated by a root index value of a PD2DSS. In Case 1 of Table 16, a transmission synchronization source is an eNodeB, and thus, one of 25, 29, and 34, which are identical to the root indices of a PSS may be used as a root index of a PD2DSS. Conversely, in Cases 2 to 4, newly defined root indices, which are different from the PSS, may be used as a PD2DSS. For example, the root indices of Table 4 may be used.

Cases 2 to 4 in which a transmission synchronization source is a UE may be classified into a case corresponding to Cases 2 and 3 in which an original synchronization source is an eNodeB and a case corresponding to Case 4 in which an original synchronization source is an ISS. For example, when three root indices selected from Table 4 are X, Y, and Z, respectively, a transmission synchronization source may be indicated by a root index X or Y in Case 2 or 3 in which the original synchronization source is an eNodeB, and a transmission synchronization source may be indicated by a root index Z in Case 4 in which the original synchronization source is an ISS.

A stratum level may be indicated by a root index of a PD2DSS. In Case 1 in which the transmission synchronization source and the original synchronization source are an eNodeB, the root index of the PD2DSS may be indicated by one of 25, 29, and 34.

Cases 2 to 4 in which the transmission synchronization source is a UE may be indicated by a newly defined root index value of the PD2DSS. When three newly defined root index values of the PD2DSS are X, Y, and Z, respectively, each of Cases 2 to 4 may be indicated by X, Y, and Z. For example, Case 2 may b indicated by X, Case 3 may be indicated by Y, and Case 4 may be indicated by Z.

When the type of the synchronization source is an eNodeB (Case 1), a physical layer cell ID ($N_{ID}^{cell}$) corresponding to a PCID of the eNodeB may be used as a Physical Synchronization Source Identity (PSSID). The physical layer cell ID may be expressed as $N_{ID}^{cell} = 3N_{ID}^{(1)} + N_{ID}^{(2)}$, and $N_{ID}^{(2)}$ may be mapped in one-to-one correspondence to root indices of the PD2DSS that may have three values, and may have an integer in a range from 0 to 2. In this instance, the root index of the PD2DSS may have one of 25, 29, and 34, which are identical to the root indices of the PSS. $N_{ID}^{(1)}$ may be mapped in one-to-one correspondence to root indices of an SD2DSS that may have 168 values, and may have an integer in a range from 0 to 167. In this instance, a value that is identical to the SSS may be used as the value of the SD2DSS.

When the type of the synchronization source is a synchronization source derived from an eNodeB (an SS relaying an eNodeB) (Cases 2 and 3), a Physical Synchronization Source Identity (PSSID) may be mapped to 168 or K IDs based on a PCID of the eNodeB using a predetermined rule, wherein K is a value that is less than 168. Therefore, the PSSID may have a value in a range from 0 to 167 or in a range from 0 to K−1. The PSSID may be expressed as $N_{ID}^{D2D} = N_{ID}^{(1)}$, and $N_{ID}^{(1)}$ associated with the SD2DSS may be mapped in one-to-one correspondence to an SSS that may have 168 values, and may have an integer in a range from 0 to 167, or may be mapped in one-to-one correspondence to K values, based on sequences that are modified or partially selected from an SSS having 168 sequences and may have an integer in a range from 0 to K−1, wherein K is a value less than 168. In this instance, an accurate PCID of the eNodeB may be transmitted through a PD2DSCH.

When the type of the synchronization source is an ISS or a synchronization source derived from an ISS (Case 4), a Proximity based Services (ProSe) UE ID of a UE corresponding to the ISS may be used as a Physical Synchronization Source Identity (PSSID), and the PSSID may be mapped to 168 or K IDs based on a predetermined mapping rule, wherein K is a value that is less than 168. Therefore, the PSSID may have a value in a range from 0 to 167 or in a range from 0 to K−1. The PSSID may be expressed as $N_{ID}^{D2D} = N_{ID}^{(1)}$, and $N_{ID}^{(1)}$ associated with the SD2DSS may be mapped in one-to-one correspondence to an SSS that may have 168 values, and may have an integer in a range from 0 to 167, or may be mapped in one-to-one correspondence to K values, based on sequences that are modified or partially selected from an SSS having 168 sequences and may have an integer in a range from 0 to K−1, wherein K is a value less than 168. Therefore, the PSSID may have a value in a range from 0 to 167 or in a range from 0 to K−1. In this instance, an accurate PCID of the ISS may be transmitted through a PD2DSCH.

Embodiment 3-3

TABLE 17

| Case | Type of SS | | PSSID | Stratum level (hop count) |
|---|---|---|---|---|
| | Tx SS | Original SS | | |
| Case 1: eNodeB→UE$_1$ | eNodeB | eNodeB | PCID of eNodeB | $1^{st}$ (Index 0 (or 1)) |
| Case 2: eNodeB→UE$_1$→UE$_2$ | SS relaying eNodeB UE(=UE$_1$) | eNodeB | PCID of eNodeB | $2^{nd}$ (Index 1 (or 2)) |
| Case 3: eNodeB→UE$_1$→UE$_2$→UE$_3$ | SS relaying eNodeB UE(=UE$_2$) | eNodeB | PCID of eNodeB | $3^{rd}$ (Index 2 (or 3)) |
| Case 4: ISS(=UE$_A$)→ . . . → UE$_B$ | ISS or SS relaying ISS UE(e.g. UE$_A$) | ISS(=UE$_A$) | Based on ISS(=UE$_A$) ID | $1^{st}$ (Index 0 (or 1))(or not defined) |

In the present embodiment, when a type of a Synchronization Source (SS) is an eNodeB or an SS derived from an eNodeB (SS relaying eNodeB), a PCID of the eNodeB may be used as a Physical Synchronization Source Identity (PSSID), and 504 unique PSSIDs may exist.

When the type of the Synchronization Source (SS) is an ISS or an SS derived from an ISS (an SS relaying an ISS), a PSSID based on a UE ID of the ISS may be used, and 168 or K unique PSSIDs may exist, wherein K is a value that is less than 168.

In the present embodiment, a type of a transmission synchronization source may be indicated by a root index value of a PD2DSS. For example, the cases of Table 17 may be classified into two cases, that is, a case corresponding to Case 1 in which a transmission synchronization source is an eNodeB and the other case corresponding to Cases 2 to 4 in which a transmission synchronization source is a UE, and each case may be indicated by a root index value of a PD2DSS. A PD2DSS when the transmission synchronization source is an eNodeB, may use 25, 29, and 34, which are identical to the root indices of a PSS A PD2DSS when the transmission synchronization source is a UE, may use newly defined root indices which are different from the root indices of a PSS. For example, the root indices of Table 4 may be used.

When the transmission synchronization source is a UE, a type of an original synchronization source may be indicated by a Physical D2D Synchronization Channel (PD2DSCH). For example, Cases 2 to 4 of Table 17 may be indicated based on the classification into two cases, that is, a case corresponding to Cases 2 and 3 in which a type of an original synchronization source is an eNodeB and the other case corresponding to Case 4 in which a type of an original synchronization source is an Independent Synchronization Source (ISS). Therefore, an indication value of the PD2DSCH may have a one-bit value.

When the transmission synchronization source is a UE and the original synchronization source is an eNodeB, a stratum level may be indicated by a location where a D2DSS is transmitted in a frequency-resource domain or a PD2DSCH. For example, Cases 2 and 3 corresponding to the condition from Table 15 may be indicated based on the classification into two cases, that is, Case 2 in which a stratum level is a second stratum and Case 3 in which a stratum level is a third stratum. Therefore, an indication value of the PD2DSCH may have a 1-bit value.

The stratum level when the transmission synchronization source is an eNodeB is as many as 1 event and thus, it may be recognized through information associated with a type of a transmission synchronization source. Also, the case in which the transmission synchronization source is an ISS corresponds to Case 4, which is as many as 1 event, and thus, it may be recognized through information associated with an original synchronization source, and thus, this may not need to be indicated separately.

When the type of the synchronization source is an eNodeB, a physical layer cell ID ($N_{ID}^{cell}$) corresponding to a PCID of the eNodeB may be used as a Physical Synchronization Source Identity (PSSID). The physical layer cell ID may be expressed as $N_{ID}^{cell}=3N_{ID}^{(1)}+N_{ID}^{(2)}$, and $N_{ID}^{(2)}$ may be mapped in one-to-one correspondence to root indices of the PD2DSS that may have three values, and may have an integer in a range from 0 to 2. In this instance, the root index of the PD2DSS may have one of 25, 29, and 34, which are identical to the root indices of the PSS. $N_{ID}^{(1)}$ may be mapped in one-to-one correspondence to root indices of an SD2DSS that may have 168 values, and may have an integer in a range from 0 to 167. In this instance, a value that is identical to the SSS may be used as the value of the SD2DSS.

Even when the type of the synchronization source is a synchronization source derived from an eNodeB, a Physical Synchronization Source Identity (PSSID) may have a value identical to the PCID of the eNodeB, and 504 unique PSSIDs may exist. The PSSID may be expressed as $N_{ID}^{D2D}=3N_{ID}^{(1)}+N_{ID}^{(2)}$, and $N_{ID}^{(2)}$ may be mapped in one-to-one correspondence to root indices of the PD2DSS that may have three values, and may have an integer in a range from 0 to 2. In this instance, newly defined root indices which are different from the root indices of the PSS may be used as a root index of the PD2DSS, and for example, the root indices of Table 4 may be used. For $N_{ID}^{(1)}$, a value of an SD2DSS that is mapped in one-to-one correspondence to an SSS having 168 sequences may be used. Therefore, the SD2DSS may have an integer in a range from 0 to 167, and a PSSID may be mapped to 504(=3*168) IDs.

When the type of the synchronization source is an ISS or a synchronization source derived from an ISS (Case 4), a Proximity based Services (ProSe) UE ID of a UE corresponding to the ISS may be used as a Physical Synchronization Source Identity (PSSID), and the PSSID may be mapped to 168 or K IDs based on a predetermined mapping rule, wherein K is a value that is less than 168. Therefore, the PSSID may have a value in a range from 0 to 167 or in a range from 0 to K−1. The PSSID may be expressed as $N_{ID}^{D2D}=N_{ID}^{(1)}$, and $N_{ID}^{(1)}$ associated with the SD2DSS may be mapped in one-to-one correspondence to an SSS that may have 168 values, and may have an integer in a range from 0 to 167, or may be mapped in one-to-one correspondence to K values, based on sequences that are modified or partially selected from an SSS having 168 sequences and may have an integer in a range from 0 to K−1, wherein K is a value less than 168. Therefore, the PSSID may have a value in a range from 0 to 167 or in a range from 0 to K−1. In this instance, an accurate UE ID of the ISS may be transmitted through a PD2DSCH.

Embodiment 3-4

TABLE 18

| | Type of SS | | | Stratum level |
|---|---|---|---|---|
| Case | Tx SS | Original SS | PSSID | (hop count) |
| Case 1: eNodeB→UE$_1$ | eNodeB | eNodeB | PCID of eNodeB | 1$^{st}$ (Index 0 (or 1)) |
| Case 2: eNodeB→UE$_1$→UE$_2$ | SS relaying eNodeB UE(=UE$_1$) | eNodeB | Based on UE(=UE$_1$) ID | 2$^{nd}$ (Index 1 (or 2)) |
| Case 3: eNodeB→UE$_1$→UE$_2$→UE$_3$ | SS relaying eNodeB UE(=UE$_2$) | eNodeB | Based on UE(=UE$_2$) ID | 3$^{rd}$ (Index 2 (or 3)) |

TABLE 18-continued

| | Type of SS | | | Stratum level |
|---|---|---|---|---|
| Case | Tx SS | Original SS | PSSID | (hop count) |
| Case 4: ISS(=UE$_A$)→ ... → UE$_B$ | ISS or SS relaying ISS UE(e.g. UE$_A$) | ISS(=UE$_A$) | Based on UE(e.g. UE$_A$) ID | $1^{st}$ (Index 0 (or 1))(or not defined) |

In the present embodiment, when the type of the Synchronization Source (SS) is an eNodeB, a PCID of the eNodeB may be used as a Physical Synchronization Source Identity (PSSID), and 504 unique PSSIDs may exist.

When the type of the Synchronization Source (SS) is an SS derived from an eNodeB (an SS relaying an eNodeB), an ISS, or an SS derived from an ISS (an SS relaying an ISS), a PSSID based on a UE ID of a transmission synchronization source may be used as a PSSID, and 504 unique PSSIDs may exist.

In the present embodiment, a type of a transmission synchronization source may be indicated by a root index value of a PD2DSS. For example, the cases of Table 18 may be classified into two cases, that is, a case corresponding to Case 1 in which a transmission synchronization source is an eNodeB and the other case corresponding to Cases 2 to 4 in which a transmission synchronization source is a UE, and each case may be indicated by a root index value of a PD2DSS. A PD2DSS when the transmission synchronization source is an eNodeB, may use 25, 29, and 34, which are identical to the root indices of a PSS A PD2DSS when the transmission synchronization source is a UE may use newly defined root indices which are different from the root indices of a PSS. For example, the root indices of Table 4 may be used.

When the transmission synchronization source is a UE, a type of an original synchronization source may be indicated by a Physical D2D Synchronization Channel (PD2DSCH). For example, the cases of Table 18 may be indicated based on the classification into two cases, that is, a case corresponding to Cases 2 and 3 in which a type of an original synchronization source is an eNodeB and the other case corresponding to Case 4 in which a type of an original synchronization source is an Independent Synchronization Source (ISS). Therefore, an indication value of the PD2DSCH may have a one-bit value.

A stratum level when the synchronization source is an eNodeB does not exist, excluding Case 1, and thus, this may be recognized through information associated with a transmission synchronization source. Therefore, this may not need to be separately indicated.

When the synchronization source is an SS derived from an eNodeB (an SS relaying an eNodeB), a stratum level may be indicated by a location where a D2DSS is transmitted in a frequency-resource domain or a PD2DSCH. For example, cases of Table 18 may be classified into two cases, that is, a case corresponding to Case 2 in which a stratum level is 2 and a case corresponding to Case 3 in which a stratum level is 3. Therefore, an indication value of the PD2DSCH may have a 1-bit value.

When a type of the synchronization source is an eNodeB, a physical layer cell ID ($N_{ID}^{cell}$) corresponding to a PCID of the eNodeB may be used as a Physical Synchronization Source Identity (PSSID). The physical layer cell ID may be expressed as $N_{ID}^{cell}=3N_{ID}^{(1)}+N_{ID}^{(2)}$, and $N_{ID}^{(2)}$ may be mapped in one-to-one correspondence to root indices of the PD2DSS that may have three values, and may have an integer in a range from 0 to 2. In this instance, the root index of the PD2DSS may have one of 25, 29, and 34, which are identical to the root indices of the PSS. $N_{ID}^{(1)}$ may be mapped in one-to-one correspondence to root indices of an SD2DSS that may have 168 values, and may have an integer in a range from 0 to 167. In this instance, a value that is identical to the SSS may be used as the value of the SD2DSS.

When the type of the synchronization source is a synchronization source derived from an eNodeB (an SS relaying an eNodeB), an ISS, or a synchronization source derived from an ISS (an SS relaying an ISS), a Proximity based Services (ProSe) UE ID of a transmission (Tx) UE may be used as a Physical Synchronization Source Identity (PSSID), and the PSSID may be mapped to 504 IDs based on a predetermined mapping rule. The PSSID may be expressed as $N_{ID}^{D2D}=3N_{ID}^{(1)}+N_{ID}^{(2)}$, and $N_{ID}^{(2)}$ may be mapped in one-to-one correspondence to root indices of the PD2DSS that may have three values, and may have an integer in a range from 0 to 2. In this instance, newly defined root indices which are different from the root indices of the PSS may be used as a root index of the PD2DSS, and for example, the root indices of Table 4 may be used. $N_{ID}^{(1)}$ associated with the SD2DSS may be mapped in one-to-one correspondence to an SSS having 168 sequences and may have an integer in a range from 0 to 167. Therefore, the PSSID may be mapped to 504(=3*168) IDs.

Embodiment 3-5

TABLE 19

| | Type of SS | | | Stratum level |
|---|---|---|---|---|
| Case | Tx SS | Original SS | PSSID | (hop count) |
| Case 1: eNodeB→UE$_1$ | eNodeB | eNodeB | PCID of eNodeB | $1^{st}$ (Index 0 (or 1)) |
| Case 2: eNodeB→UE$_1$→UE$_2$ | SS relaying eNodeB UE(=UE$_1$) | eNodeB | Based on UE(=UE$_1$) ID | $2^{nd}$ (Index 1 (or 2)) |
| Case 3: eNodeB→UE$_1$→UE$_2$→UE$_3$ | SS relaying eNodeB UE(=UE$_2$) | eNodeB | Based on UE(=UE$_2$) ID | $3^{rd}$ (Index 2 (or 3)) |

TABLE 19-continued

| | Type of SS | | | Stratum level |
| --- | --- | --- | --- | --- |
| Case | Tx SS | Original SS | PSSID | (hop count) |
| Case 4: ISS(=UE$_A$)→ . . . → UE$_B$ | ISS or SS relaying ISS UE(e.g. UE$_A$) | ISS(=UE$_A$) | Based on UE(e.g. UE$_A$) ID | 1$^{st}$ (Index 0 (or 1))(or not defined) |

In the present embodiment, when a type of a Synchronization Source (SS) is an eNodeB, a PCID of the eNodeB may be used as a Physical Synchronization Source Identity (PSSID), and 504 unique PSSIDs may exist.

When the type of the Synchronization Source (SS) is an SS derived from an eNodeB (an SS relaying an eNodeB), an ISS, or an SS derived from an ISS (an SS relaying an ISS), a PSSID based on a UE ID of a transmission synchronization source may be used, and 168 or K unique PSSIDs may exist, wherein K is a value less than 168.

In the present embodiment, a type of a transmission synchronization source may be indicated by a root index value of a PD2DSS. For example, cases of Table 19 may be classified into two cases, that is, a case corresponding to Case 1 in which a transmission synchronization source is an eNodeB and the other case corresponding to Cases 2 to 4 in which a transmission synchronization source is a UE, and each case may be indicated by a root index value of a PD2DSS. A PD2DSS when the transmission synchronization source is an eNodeB, may use 25, 29, and 34, which are identical to the root indices of a PSS. A PD2DSS when the transmission synchronization source is a UE, may use newly defined root indices which are different from the root indices of a PSS. For example, the root indices of Table 4 may be used.

Cases 2 to 4 in which a transmission synchronization source is a UE may be classified into a case corresponding to Cases 2 and 3 in which an original synchronization source is an eNodeB and a case corresponding to Case 4 in which an original synchronization source is an ISS. For example, when three root indices selected from Table 4 are X, Y, and Z, respectively, a transmission synchronization source may be indicated by a root index X or Y in Case 2 or 3 in which the original synchronization source is an eNodeB, and a transmission synchronization source may be indicated by a root index Z in Case 4 in which the original synchronization source is an ISS.

A stratum level may be indicated by a root index of a PD2DSS. In Case 1 in which the transmission synchronization source and the original synchronization source are an eNodeB, the root index of the PD2DSS may be indicated by one of 25, 29, and 34.

Cases 2 to 4 in which the transmission synchronization source is a UE may be indicated by a newly defined root index value of the PD2DSS. When three newly defined root index values of the PD2DSS are X, Y, and Z, respectively, each of Cases 2 to 4 may be indicated by X, Y, and Z. For example, Case 2 may be indicated by X, Case 3 may be indicated by Y, and Case 4 may be indicated by Z.

When the type of the synchronization source is an eNodeB, a physical layer cell ID ($N_{ID}^{cell}$) corresponding to a PCID of the eNodeB may be used as a Physical Synchronization Source Identity (PSSID). The physical layer cell ID may be expressed as $N_{ID}^{cell}=3N_{ID}^{(1)}+N_{ID}^{(2)}$, and $N_{ID}^{(2)}$ may be mapped in one-to-one correspondence to root indices of the PD2DSS that may have three values, and may have an integer in a range from 0 to 2. In this instance, the root index of the PD2DSS may have one of 25, 29, and 34, which are identical to the root indices of the PSS. Ng) may be mapped in one-to-one correspondence to root indices of an SD2DSS that may have 168 values, and may have an integer in a range from 0 to 167. In this instance, a value that is identical to the SSS may be used as the value of the SD2DSS.

When the type of the synchronization source is a synchronization source derived from an eNodeB (an SS relaying an eNodeB), an ISS, or a synchronization source derived from an ISS (an SS relaying an ISS), a Physical Synchronization Source Identity (PSSID) is based on a Proximity based Services (ProSe) UE of a transmission (Tx) UE, and may be mapped to 168 or K IDs based on a predetermined mapping rule, wherein K is a value less than 168. Therefore, the PSSID may have a value in a range from 0 to 167 or in a range from 0 to K−1. The PSSID may be expressed by $N_{ID}^{D2D}=N_{ID}^{(1)}$, and $N_{ID}^{(1)}$ associated with an SD2DSS may be mapped in one-to-one correspondences to an SSS having 168 sequences, or may be mapped to K sequences based on sequences modified or partially selected from the SSS having 168 sequences, wherein K is a value less than 168. When $N_{ID}^{(1)}$ is mapped in one-to-one correspondence to 168 sequences, it may have an integer in a range from 0 to 167, and when it is mapped in one-to-one correspondence to K sequences, it may have an integer in a range from 0 to K−1. In this instance, an accurate UE ID of the transmission synchronization source may be transmitted through a PD2DSCH.

Figure 5:
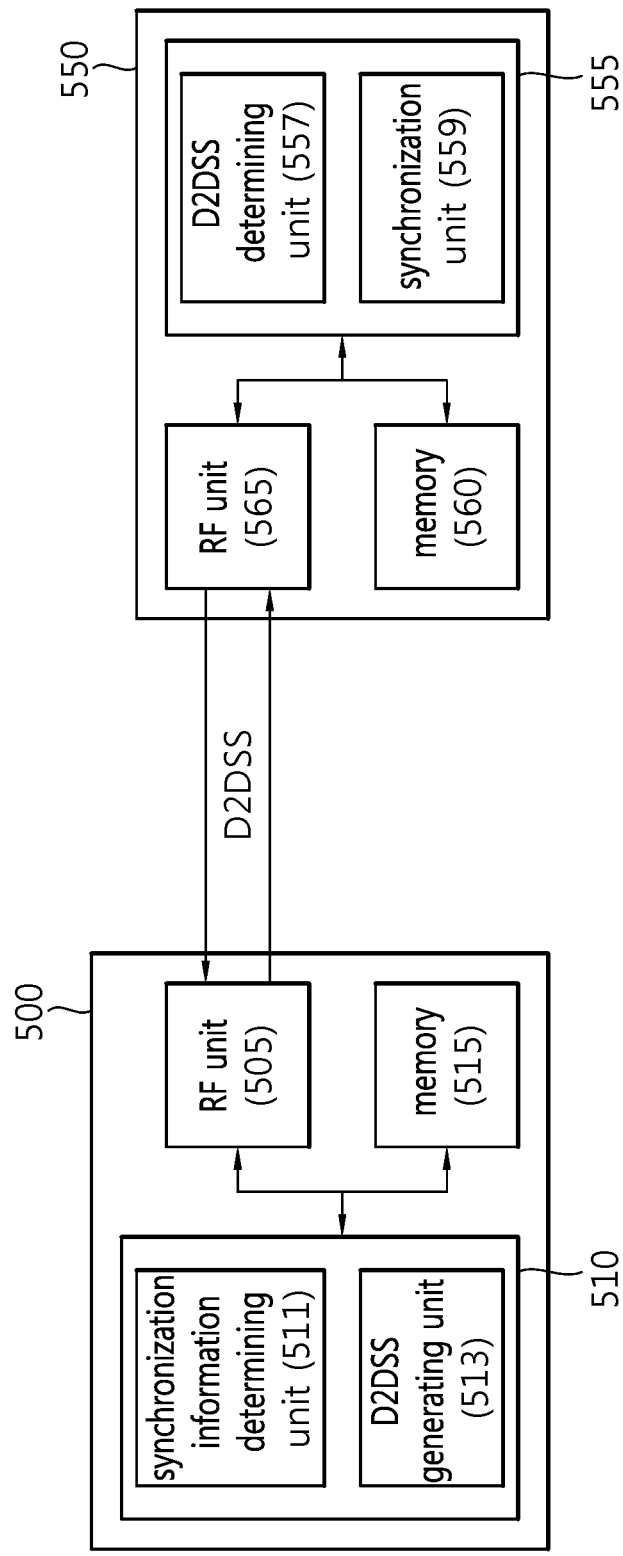
FIG. 5 is a block diagram illustrating a wireless communication system according to one or more exemplary embodiments.

FIG. 5 is a block diagram of a wireless communication system according to one or more exemplary embodiments.

Referring to FIG. 5, a D2D synchronization source 500 includes a Radio Frequency (RF) unit 505, a processor 510, and a memory 515. The memory 515 is connected to the processor 510, and stores various pieces of information for driving the processor 510. The RF unit 505 is connected to the processor 510, and transmits and/or receives a wireless signal. For example, the RF unit 505 may transmit a D2DSS to a D2D receiving UE 550.

The processor 510 may implement proposed functions, processes, and/or methods. In particular, the processor 510 may execute all operations associated with FIGS. 2 to 4. For example, the processor 510 may include a synchronization information determining unit 511 and a D2DSS generating unit 513.

The synchronization information determining unit 511 may determine synchronization information for generating a D2DSS. The synchronization information may include a type of a synchronization source, a Physical Synchronization Source Identity (PSSID), and a stratum level.

The D2DSS generating unit 513 generates a D2DSS based on the type of synchronization source, the PSSID, the stratum level information, determined in the synchronization information determining unit 511. The D2DSS may include a PD2DSS, an SD2DSS, and a PD2DSCH. The type of synchronization source, the Physical Synchronization Source Identity (PSSID), and stratum level information may be indicated by the D2DSS, and some of the information may be indicated by a location of the D2DSS in a subframe.

According to one or more exemplary embodiments, information associated with a synchronization source, such as a type of a Synchronization Source (SS), a Physical Synchronization Source Identity (PSSID), a stratum level, and the like, may be estimated based on a received D2DSS. Operations of the UE 500 may be implemented by the processor 510.

The memory 515 is connected to the processor 510, and stores various pieces of information for driving the processor 510. For example, the memory 515 may store synchronization information, and may store a PD2DSS, an SD2DSS, a PD2DSCH, and a location where a D2DSS is received in time-frequency resource domain. Also, in response to a request from the processor 510, the memory 515 may provide the synchronization information to the processor 510.

The D2D receiving UE 550 may include a processor 555, a memory 560, and a Radio Frequency (RF) unit 565. The RF unit 565 is connected to the processor 555, and transmits and/or receives a wireless signal. The processor 555 may implement proposed functions, processes, and/or methods. For example, the processor 555 may include a D2DSS determining unit 557, and a synchronization unit 559.

The D2D determining unit 557 may determine a D2DSS received from the D2D synchronization source 500, so as to estimate synchronization information indicated by the received D2DSS. The synchronization information may include a type of a synchronization source, a Physical Synchronization Source Identity (PSSID), and a stratum level. The D2DSS that indicates the synchronization information may include a PD2DSS, an SD2DSS, and a PD2DSCH. Some of the synchronization information may be indicated by a location of a D2DSS in a subframe.

The synchronization unit 512 may obtain synchronization with a synchronization source, using information obtained through the D2DSS.

The processor 510 of the D2D synchronization source 500 or the processor 555 of the D2D receiving UE 550 may include an application-specific integrated circuit (ASIC), another chipset, a logic circuit, and/or a data processing device. The memory may include a Read-Only Memory (ROM), a Random Access Memory (RAM), a flash memory, a memory card, a storage medium and/or another storage device. The RF unit may include a baseband circuit for processing a wireless signal. When the embodiment is embodied as software, the described scheme may be embodied as a module (process, function, or the like) that executes the described function. The module may be stored in a memory, and may be executed by a processor. The memory may be disposed inside or outside the processor, and may be connected to the processor through various well-known means.

In the described exemplary system, although methods are described based on a flowchart as a series of steps or blocks, aspects of the present invention are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present invention.

Hereinafter, a method of configuring a D2DSS based on synchronization information will be described in detail.

First, a method of configuring a PD2DSS will be described, with respect to different types of synchronization sources. Although the description provided below is based when the maximum stratum level is a third layer (a second layer when an eNodeB is excluded) in cases where an original synchronization source is an eNodeB, and when the maximum stratum level is a first layer (or not defined) in cases where an original synchronization source is an ISS, as illustrated in FIG. 4, they may be applied to the case mentioned through FIGS. 2 and 3.

Configuration 1) when a Synchronization Source is an eNodeB

In this instance, a PD2DSS is a synchronization signal transmitted from an eNodeB to a UE, and the UE may be a UE in the network coverage (in-coverage UE). In this instance, both an original synchronization source and a transmission synchronization source are an eNodeB, and thus, a PD2DSS identical to a PSS may be transmitted. Therefore, a root index of the PD2DSS which is identical to the PSS may have one of 25, 29, and 34.

Referring again to FIG. 4, this may correspond to a transmission from the eNodeB 400 to the first UE 410.

Configuration 2) when a Synchronization Source is an SS Derived from an eNodeB (an SS Relaying an eNodeB), and a Transmission UE is a UE in the Network Coverage, e.g., in the Coverage of an eNodeB, (in-Coverage UE)

In this instance, a transmitted PD2DSS is a synchronization signal modified from a PSS (for example, a root index or the like), and the PD2DSS may be configured from a D2DSS sequence included in D2DSSue_net. The D2DSSue_net indicates a set of D2DSS sequences transmitted from a UE of which a transmission timing reference is an eNodeB. Transmission of the D2D synchronization signal is a transmission from a UE to a UE, a transmission (Tx) UE is an in-coverage UE, and a reception (Rx) UE is a UE outside the network coverage (out-coverage UE).

Here, the Tx UE receives, from an eNodeB, a synchronization signal generated from a PSS/SSS, and transmits, to the Rx UE, synchronization information obtained through the reception through a synchronization signal generated from a first D2DSS sequence (a first PD2DSS sequence+a first SD2DSS sequence) included in the D2DSSue_net.

Referring again to FIG. 4, this may correspond to a transmission from the first UE 410 to the second UE 420. In this instance, a newly defined root index, which is different from a root index of a PSS, may be used as a root index of a PD2DSS, and the root index of the PD2DSS may be defined by Table 4. When three newly defined root indices are X, Y, and Z, respectively, X may be used for this case. That is, X may be used as a root index for the first PD2DSS sequence.

Configuration 3) when a Synchronization Source is an SS Derived from an eNodeB (an SS Relaying an eNodeB), and a Transmission UE is a UE Outside of the Network Coverage, e.g., Outside of a Coverage of an eNodeB, (Out-Coverage UE)

In this instance, a transmitted PD2DSS may be configured from a D2DSS sequence included in the D2DSSue_net, in the same manner as the case in which a transmission UE is an in-coverage UE. In this instance, both a Tx UE and a Rx UE may be out-coverage UEs.

Here, the Tx UE receives a synchronization signal generated from a first D2DSS sequence (a first PD2DSS sequence+a first SD2DSS sequence) included in the D2DSSue_net, from an in-coverage UE, and transmits, to the Rx UE, synchronization information obtained through the reception, through a synchronization signal generated from a second D2DSS sequence (a second PD2SS sequence+a second SD2SS sequence) included in the D2DSSue_net.

Referring again to FIG. 4, this may correspond to a transmission from the second UE 420 to the third UE 430. In this instance, a newly defined root index, which is different from a root index of a PSS, may be used as a root index of a PD2DSS, and the root index of the PD2DSS may be defined by Table 4. When three newly defined root indices are X, Y, and Z, respectively, Y may be used, which is different from a root index used when a transmission UE is an in-coverage UE. That is, Y may be used as a root index for the second PD2DSS sequence.

Configuration 4) when a Synchronization Source is an ISS or an SS Derived from an ISS (an SS Relaying an ISS)

In this instance, a transmitted PD2DSS may be a synchronization signal modified from a PSS (for example, a root index or the like). The PD2DSS may be configured from a D2DSS sequence included in D2DSSue_oon, and may be transmitted. The D2DSSue_oon indicates a set of D2DSS sequences transmitted from a UE of which a transmission timing reference is not an eNodeB. In this instance, both a Tx UE and an Rx UE may be out-coverage UEs, and the Tx UE may be an ISS or an SS derived from an ISS (an SS relaying an ISS).

Here, when the Tx UE is an ISS, the Tx UE may transmit synchronization information of itself to the Rx UE through a synchronization signal generated from a third D2DSS sequence (a third PD2DSS sequence+a third SD2DSS sequence) included in the D2DSSue_oon.

Here, when the Tx UE is an SS derived from an ISS, the Tx UE receives, from the ISS or another SS derived from the ISS, a synchronization signal generated from the third D2DSS sequence (the third PD2DSS sequence+ the third SD2DSS sequence) included in the D2DSSue_oon, and may or may not transmit, to the reception (Rx) UE, the synchronization information obtained through the reception, through the synchronization signal generated from the third D2DSS sequence (the third PD2DSS sequence+third SD2DSS sequence) included in the D2DSSue_oon, as occasion arises.

Referring again to FIG. 4, this may correspond to a transmission from the fourth UE 440 to the fifth UE 450. In this instance, a newly defined root index, which is different from a root index of a PSS, may be used as a root index of a PD2DSS, and the root index of the PD2DSS may be defined by Table 4. When three newly defined root indices are X, Y, and Z, respectively, Z may be used as a root index, which is different from X and Y which are used when a synchronization source is an SS derived from an eNodeB (an SS relaying an eNodeB). That is, Z may be used as a root index for the third PD2DSS sequence.

Hereinafter, a method of configuring a PD2DSS when a D2D reception (Rx) UE is inside or outside the network coverage, will be described.

1) D2D Reception (Rx) UE Inside the Network Coverage

A D2D Rx UE inside the network coverage detects a PSS/SSS from an eNodeB, and selects the same as a timing reference. In this instance, the PSS may correspond to the PSS of the configuration 1. The D2D Rx UE inside the network coverage may detect a D2DSS in addition to the PSS/SSS from the eNodeB, but may prioritize the PSS/SSS from the eNodeB and select the same as a timing reference. The D2D Rx UE may transmit a D2DSS to another UE. In this instance, a transmitted PD2DSS may correspond to the PD2DSS of the configuration 2.

2) D2D Reception (Rx) UE Outside the Network Coverage

The D2D Rx UE outside the network coverage may detect one or more D2DSSs from one or more UEs and may select one of the signals as a timing reference. In this instance, a D2D Tx UE may be one of an ISS, an SS derived from an eNodeB (an SS relaying an eNodeB), and an SS derived from an ISS (an SS relaying an ISS). When the D2DSS is not detected, the D2D Rx UE itself may act as an ISS. In this instance, a root index of the detected PD2DSS may be one of X, Y, and Z. Hereinafter, a timing reference selecting method for each case and a method of transmitting a PD2DSS when a D2D Rx UE is a new synchronization source, will be described.

a) When a PD2DSS of which a Root Index is X is Received and Selected as a Timing Reference In this instance, a D2D Rx UE detects a D2DSS including a PD2DSS corresponding to the configuration 2, and selects the same as a timing reference. When the UE is a synchronization source of the D2DSS, the UE may transmit a D2DSS. In this instance, a transmitted PD2DSS may be configured as a PD2DSS of the configuration 3.

a) When a PD2DSS of which a Root Index is Y is Received and Selected as a Timing Reference In this instance, a D2D Rx UE detects a D2DSS including a PD2DSS corresponding to the configuration 3, and selects the same as a timing reference. When the UE is a synchronization source of the D2DSS, the UE may transmit a D2DSS. In this instance, a transmitted PD2DSS may be configured as a PD2DSS of the configuration 3.

a) When a PD2DSS of which a Root Index is Z is Received and Selected as a Timing Reference In this instance, a D2D Rx UE detects a D2DSS including a PD2DSS corresponding to the configuration 4, and selects the same as a timing reference. When the UE is a synchronization source of the D2DSS, the UE may transmit a D2DSS. In this instance, a transmitted PD2DSS may be configured as a PD2DSS of the configuration 4.

d) When a D2DSS is not Detected

In this instance, a D2D Rx UE may act as an ISS and transmits a D2DSS. In this instance, a transmitted PD2DSS may be configured as a PD2DSS of the configuration 4.

When the D2D Rx UE receives all PD2DSSs of which root indices are X, Y, and Z, a timing reference may be selected in order of X>Y>Z, or in different order of priority.

Hereinafter, when an original synchronization source is an eNodeB or an ISS, a method of configuring PD2DSSs of the configurations 1 to 4 based on each hop count and a stratum level will be described.

First, when an original synchronization source is an eNodeB, a stratum level and a configuration of a D2DSS will be described for each hop count. When the hop count is 1, the stratum level is set to 0 and a transmitted D2DSS may include a PSS of the configuration 1. When the hop count is 2, the stratum level is set to 1 and a transmitted D2DSS may include a PD2DSS of the configuration 2. When the hop count is 3, the stratum level is set to 2 and a transmitted D2DSS may include a PD2DSS of the configuration 3. When the hop count is 4 or more, the stratum level is set to 2 and a transmitted D2DSS may include a PD2DSS of the configuration 3. The configurations may be applied to the embodiments that have been described with reference to FIGS. 2 to 4, and other configurations may be applied to other embodiments.

Subsequently, when an original synchronization source is an ISS, a stratum level and a configuration of a D2DSS will be described for each hop count. When the hop count is 1, the stratum level is set to 0 and a transmitted D2DSS may include a PD2DSS of the configuration 4. When the hop count is 1 or more, the stratum level is set to 0 and a transmitted D2DSS may include a PD2DSS of the configuration 4. The configurations may be applied to the embodiments that have been described with reference to FIG. 4, and other configurations may be applied to other embodiments.

A sequence of an SD2DSS may be defined to use one of 168 sequences that are generated by interleaving two binary sequences having a length of 31, in the same manner as a sequence of an SSS, or may be defined to use only K sequences based on sequences modified or partially selected from the SSS having 168 sequences. In this instance, K may be an integer less than 168.

Figure 6:
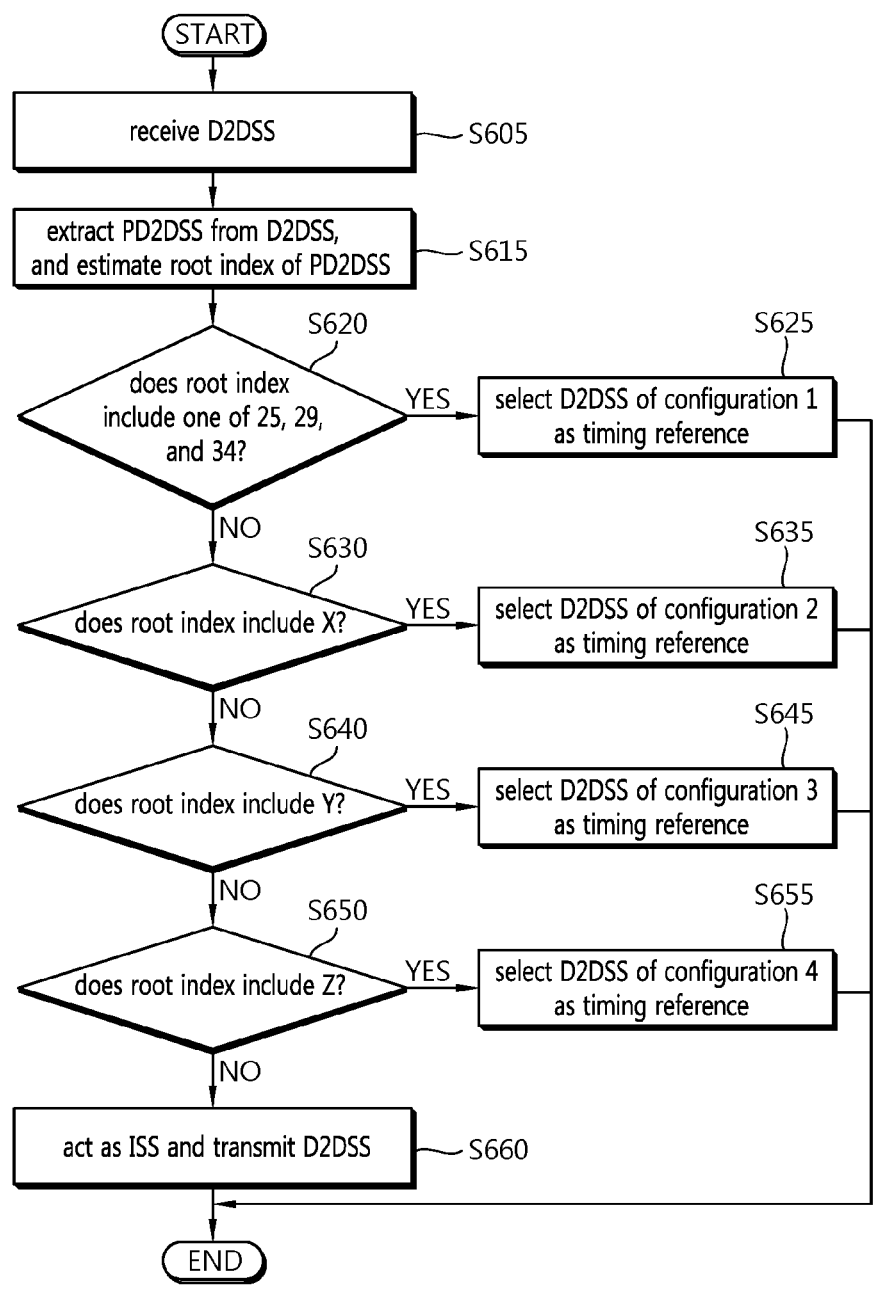
FIG. 6 is a flowchart illustrating an example of a method in which a D2D reception (Rx) UE selects a D2D transmission mode based on a root index value of a received PD2DSS according to one or more exemplary embodiments.

FIG. 6 is a flowchart illustrating an example of a method in which a D2D Rx UE selects a D2D transmission mode based on a root index value of a received PD2DSS according to one or more exemplary embodiments.

Referring to FIG. 6, a method of estimating a D2D transmission mode includes: receiving at least one D2DSS in operation S605, and extracting a PD2DSS from the received D2DSS so as to estimate a root index of the PD2DSS in operation S615. Subsequently, the D2D Rx UE determines whether a D2DSS of which a root index value corresponds to one of 25, 29 and 34 exists in operation S620, and, when it is determined that the corresponding D2DSS exists, the D2D transmission mode select the D2DSS of the configuration 1 as a timing reference S625.

When it is determined that a corresponding root index value does not exist in operation S620, the D2D Rx UE determines whether a root index value of a PD2DSS corresponding to X exists among previously defined values in operation S630, and when it is determined that a corresponding root index value exists, the D2D Rx UE selects a D2DSS of the configuration 2 as a timing reference in operation 635. The previously defined root index values may be one of the root indices of Table 4, or a first value of the three root indices may be set to X.

When it is determined that a corresponding root index value does not exist in operations S620 and S630, the D2D Rx UE determines whether a root index value of a PD2DSS corresponding to Y exists among previously defined values in operation S640, and when it is determined that a corresponding root index value exists, the D2D Rx UE selects a D2DSS of the configuration 3 as a timing reference in operation 645. The previously defined root index values may be one of the root indices of Table 4, or a second value of the three root indices may be set to Y.

When it is determined that a corresponding root index value does not exist in operations S620, S630, and S640, the D2D Rx UE determines whether a root index value of a PD2DSS corresponding to Z exists among previously defined values in operation S650, and when it is determined that a corresponding root index value exists, the D2D Rx UE selects a D2DSS of the configuration 4 as a timing reference in operation 655. The previously defined root index values may be one of the root indices of Table 4, or a third value of the three root indices may be set to Z.

When root indices corresponding to 25, 29, 34, X, Y, and Z are not detected in operations S620, 630, 640, and 650, the UE itself act as an ISS and transmits a D2DSS in operation S660. In this instance, the transmitted D2DSS may be configured to include a PD2DSS of the configuration 4.

Exemplary embodiments provide a root index of a PD2DSS used for each configuration type. In the case of the configuration 1 (a PSS/SSS configuration when a synchronization source is an eNodeB), one of 25, 29, and 34 which are root indices of a PSS is used as a root index of a PD2DSS. In the case of the configuration 2 (a D2DSS sequence configuration included in D2DSSue_net when a synchronization source is an SS derived from an eNodeB (an SS relaying an eNodeB) and a Tx UE is an in-coverage UE), one of three new root indices is used (for example, X which is a first value of the three new root indices of Table 4). In the case of the configuration 3 (a D2DSS sequence configuration included in D2DSSue_net when a synchronization source is an SS derived from an eNodeB (an SS relaying an eNodeB), and a Tx UE is an out-coverage UE), another of the three new root indices is used (for example, Y which is a second value of the three new root indices of Table 4). In the case of the configuration 4 (a D2DSS sequence configuration included in D2DSSue_oon when a synchronization source is an ISS or an SS derived from an ISS (an SS relaying an ISS)), the other of the three new root indices is used (for example, Z which is a third value of the three new root indices of Table 4).

When the three new root indices are not defined and only the three existing root indices, 25, 29, and 34, are used, one of 25, 29, and 34 may be configured as X (for example, X=25), another as Y (for example, Y=29), and the other as Z (for example, Z=34).

As noted above, a type of an original synchronization source, e.g., an eNodeB or an Independent Synchronization Source (ISS) may be indicated by information other than a root index, e.g., an indication value of the PD2DSCH that may have a one-bit value. Further, it may be determined whether a transmission synchronization source is an in-coverage UE or an out-of-coverage UE based on information other than a root index.

Further, according to one or more exemplary embodiments, a UE supporting a D2D communication may receive a synchronization signal transmitted from a synchronization source, determine a root index based on the received synchronization signal, determine a synchronization timing reference based on the root index, and transmit a synchronization signal for a D2D communication based on the determined synchronization timing reference. The UE may receive more than one synchronization signals transmitted from different synchronization sources, respectively. If the received synchronization signals meet certain requirements, e.g., received signal power, the UE may choose one of the received synchronization signals and select one corresponding reference synchronization source for synchronization of the UE. By selecting one synchronization source, the UE may determine the synchronization timing reference based on the corresponding synchronization signal. A synchronization signal transmitted from a synchronization source may include a primary synchronization signal and a secondary synchronization signal. The secondary synchronization signal may be transmitted together with the primary synchronization signal or transmitted separately from the primary synchronization signal.

The UE may determine a category of a synchronization source based on a root index relating to a primary synchronization signal transmitted from the synchronization source. The primary synchronization signal may be determined as a PSS transmitted by an eNodeB or a PD2DSS transmitted by a UE based on a root index associated with the received primary synchronization signal.

Then, the UE may prioritize the synchronization source based on determining whether the synchronization source is an eNodeB, a UE synchronized with an eNodeB, or a UE having a synchronization timing reference independent from an eNodeB. The synchronization timing reference and/or the reference synchronization source may be determined based on the prioritization.

The UE may further determine whether the synchronization source is a UE located in a coverage of an eNodeB or a UE located out of a coverage of an eNodeB, among UEs synchronized with an eNodeB. In this configuration, the UE may prioritize the synchronization source further based on determining whether the synchronization source is a UE located in a coverage of an eNodeB or a UE located out of a coverage of an eNodeB. Here, the UE synchronized with an eNodeB may be a UE directly synchronized with an eNodeB or a UE having an eNodeB as an original synchronization source.

Once the UE selects the reference synchronization source from which the UE completes its own synchronization process, the UE may generate a synchronization signal for a D2D communication with a target UE based on the category of the reference synchronization source. For example, the UE may generate the synchronization signal for a D2D communication with the target UE based on a set for in-coverage (D2DSSue_net) when an eNodeB or a UE synchronized with an eNodeB is selected as the reference synchronization source. Further, the UE may generate the synchronization signal for a D2D communication with the target UE based on a set for out-of-coverage (D2DSSue_oon) when a UE having a synchronization timing reference independent from an eNodeB is selected as the reference synchronization source. Since the UE is not an eNodeB, the synchronization signal for a D2D communication with the target UE is related to a root index different from the root indexes 25, 29, and 34.

According to one or more exemplary embodiments, the synchronization signal for a D2D communication with the target UE may include a primary D2D synchronization signal associated with a root index corresponding to a number different from 25, 29, and 34 and a secondary D2D synchronization signal. The primary D2D synchronization signal and the secondary D2D synchronization signal may be transmitted through different frequency-time resources. The secondary D2D synchronization signal may be generated based on one of 168 identities corresponding to the set for in-coverage (D2DSSue_net) or one of 168 identities corresponding to the set for out-of-coverage (D2DSSue_oon).

Without selecting a synchronization reference source, the UE may independently determine a synchronization timing reference, thereby becoming an independent synchronization source not associated with a synchronization timing of an eNodeB. The UE may transmit a synchronization signal determined based on a set for out-of-coverage (D2DSSue_oon), when the UE serves as an independent synchronization source (ISS) or the UE selects a reference synchronization timing source originated from a UE serving as an ISS.

According to one or more exemplary embodiments, D2D synchronization information may be efficiently indicated based on an apparatus that transmits or receives a D2D signal.

The above description is to explain exemplary embodiments of inventive concept, and it will be apparent to those skills in the art that modifications and variations can be made without departing from the spirit and scope of inventive concept. Thus, it is intended that the present invention cover the modifications and variations of exemplary embodiments provided they come within the scope of the appended claims and their equivalents.

What is claimed is:

1. A method of transceiving a synchronization signal between wireless communication devices, the method comprising:
receiving, at a first wireless communication device, a synchronization signal transmitted from a synchronization source;
determining a root index based on the received synchronization signal;
determining a synchronization timing reference based on the root index; and
transmitting, based on the determined synchronization timing reference, a synchronization signal for a direct communication between the first wireless communication device and a second wireless communication device,
wherein the determining of the synchronization timing reference comprises:
based on the root index, determining a category of the synchronization source;
prioritizing the synchronization source based on determining whether the synchronization source is an evolved NodeB (eNodeB), a wireless communication device synchronized with an eNodeB, or a wireless communication device having a synchronization timing reference independent from an eNodeB;
determining whether the synchronization source is a wireless communication device located in a coverage of an eNodeB or a wireless communication device located out of a coverage of an eNodeB, among wireless communication devices synchronized with an eNodeB;
prioritizing the synchronization source further based on determining whether the synchronization source is a wireless communication device located in a coverage of an eNodeB or a wireless communication device located out of a coverage of an eNodeB; and
determining the synchronization timing reference based on the prioritization.

2. The method of claim 1, wherein the determining of the synchronization timing reference comprises:
determining that the synchronization source is an eNodeB when the root index corresponds to 25, 29, or 34.

3. The method of claim 1, wherein the determining of the synchronization timing reference comprises:
determining that the synchronization source is a wireless communication device when the root index corresponds to a number different than 25, 29, and 34.

4. The method of claim 1, further comprising:
generating the synchronization signal for a direct communication based on a set for in-coverage when an eNodeB or a wireless communication device synchronized with an eNodeB is selected as a transmission synchronization source for the determined synchronization timing reference; and
generating the synchronization signal for a direct communication based on a set for out-of-coverage when a wireless communication device having a synchronization timing reference independent from an eNodeB is selected as the transmission synchronization source.

5. The method of claim 4, wherein the set for in-coverage and the set for out-of-coverage correspond to different root indexes, which respectively correspond to numbers different than 25, 29, and 34.

6. The method of claim 5, wherein the transmitting of the synchronization signal for a direct communication comprises:

generating a primary synchronization signal associated with a root index corresponding to a number different than 25, 29, and 34;
generating a secondary synchronization signal based on one of 168 identities corresponding to the set for in-coverage or one of 168 identities corresponding to the set for out-of-coverage; and
transmitting the primary synchronization signal and transmitting the secondary synchronization signal.

7. The method of claim 1, further comprising:
determining that the first wireless communication device is an independent synchronization source when the first wireless communication device does not determine a synchronization timing reference based on a received synchronization signal.

8. The method of claim 7, wherein the first wireless communication device transmits a synchronization signal determined based on a set for out-of-coverage, when the first wireless communication device serves as an independent synchronization source.

9. A method of transceiving a synchronization signal between wireless communication devices, the method comprising:
receiving, at a first wireless communication device, synchronization signals transmitted from different synchronization sources, respectively;
prioritizing the different synchronization sources based on categories of the different synchronization sources, the categories comprising an evolved NodeB (eNodeB), a wireless communication device synchronized with an eNodeB, and a wireless communication device having a synchronization timing reference independent from an eNodeB;
determining a reference synchronization source for the first wireless communication device among the different synchronization sources;
synchronizing with the reference synchronization source based on a synchronization timing reference associated with the reference synchronization source;
determining a root index based on a primary synchronization signal received from the respective synchronization source;
determining, based on a secondary synchronization signal received from the respective synchronization source, one of 168 identities corresponding to a set for in-coverage or one of 168 identities corresponding to a set for out-of-coverage; and
transmitting, from the first wireless communication device, a signal based on the synchronization.

10. The method of claim 9, wherein the prioritizing further comprises:
prioritizing an eNodeB over a wireless communication device synchronized with an eNodeB; and
prioritizing a wireless communication device synchronized with an eNodeB over a wireless communication device having a synchronization timing reference independent from an eNodeB.

11. The method of claim 10, wherein the prioritizing further comprises:
prioritizing a wireless communication device located in a coverage of an eNodeB over a wireless communication device located out of a coverage of an eNodeB.

12. The method of claim 10, further comprising:
determining a root index based on a synchronization signal received from the respective synchronization source; and determining a category of the respective synchronization source based on the root index.

13. The method of claim 9, further comprising:
generating a primary synchronization signal based on a category of the determined reference synchronization source, the generated primary synchronization signal relating to a root index corresponding to 26 or 37;
generating a secondary synchronization signal relating to one of 168 identities corresponding to a set for in-coverage or one of 168 identities corresponding to a set for out-of-coverage; and
transmitting the generated primary synchronization signal and the generated secondary synchronization signal to a target wireless communication device for providing a synchronization opportunity.

14. The method of claim 13, wherein:
when the determined reference synchronization source corresponds to an eNodeB or a wireless communication device synchronized with an eNodeB, the generated secondary synchronization signal relates to one of 168 identities corresponding to the set for in-coverage.

15. The method of claim 13, wherein:
when the determined reference synchronization source corresponds to a wireless communication device having a synchronization timing reference independent from an eNodeB, the generated secondary synchronization signal relates to one of 168 identities corresponding to the set for out-of-coverage.

16. The method of claim 9, wherein the wireless communication device synchronized with an eNodeB comprises a wireless communication device directly synchronized with an eNodeB and a wireless communication device having an eNodeB as an original synchronization source with indirect synchronization.

17. A method of transceiving a synchronization signal between wireless communication devices, the method comprising:
receiving, at a first wireless communication device, synchronization signals transmitted from different synchronization sources, respectively;
prioritizing the different synchronization sources based on categories of the different synchronization sources, the categories comprising an evolved NodeB (eNodeB), a wireless communication device synchronized with an eNodeB, and a wireless communication device having a synchronization timing reference independent from an eNodeB;
determining a reference synchronization source for the first wireless communication device among the different synchronization sources;
synchronizing with the reference synchronization source based on a synchronization timing reference associated with the reference synchronization source; and
transmitting, from the first wireless communication device, a signal based on the synchronization, wherein the transmitting the signal based on the synchronization comprises:
generating a primary synchronization signal based on a category of the determined reference synchronization source, the generated primary synchronization signal relating to a root index corresponding to 26 or 37;
generating a secondary synchronization signal relating to one of 168 identities corresponding to a set for in-coverage or one of 168 identities corresponding to a set for out-of-coverage; and transmitting the primary synchronization signal and the secondary synchronization signal to a target wireless communication device for providing a synchronization opportunity.

18. The method of claim 17, wherein:

when the determined reference synchronization source corresponds to an eNodeB or a wireless communication device synchronized with an eNodeB, the generated secondary synchronization signal relates to one of 168 identities corresponding to the set for in-coverage.

19. The method of claim 17, wherein:

when the determined reference synchronization source corresponds to a wireless communication device having a synchronization timing reference independent from an eNodeB, the generated secondary synchronization signal relates to one of 168 identities corresponding to the set for out-of-coverage.

* * * * *